US006173442B1

(12) United States Patent
Agesen et al.

(10) Patent No.: US 6,173,442 B1
(45) Date of Patent: Jan. 9, 2001

(54) BUSY-WAIT-FREE SYNCHRONIZATION

(75) Inventors: Ole Agesen, Needham; David L. Detlefs, Westford, both of MA (US); Alex Garthwaite, Philadelphia, PA (US); Ross C. Knippel, Half Moon Bay; Y. Srinivas Ramakrishna, Mountain View, both of CA (US); Derek White, Reading, MA (US)

(73) Assignee: Sun Microsystems, Inc., Palo Alto, CA (US)

( * ) Notice: Under 35 U.S.C. 154(b), the term of this patent shall be extended for 0 days.

(21) Appl. No.: 09/245,778

(22) Filed: Feb. 5, 1999

(51) Int. Cl.[7] ................................................. G06F 9/45
(52) U.S. Cl. ..................... 717/5; 707/8; 717/4; 717/10
(58) Field of Search ...................... 717/9, 4, 5; 707/100, 707/103, 8; 709/103, 106; 711/118

(56) References Cited

U.S. PATENT DOCUMENTS

| | | | |
|---|---|---|---|
| 5,297,283 | * 3/1994 | Kelly, Jr. et al. .................... | 709/104 |
| 5,701,470 | * 12/1997 | Joy et al. ............................ | 707/103 |
| 5,822,588 | * 10/1998 | Sterling et al. ..................... | 717/4 |
| 5,826,081 | * 10/1998 | Zolnowsky .......................... | 709/103 |
| 5,862,376 | 1/1999 | Steele, Jr. et al. ................... | 395/677 |
| 5,875,461 | * 2/1999 | Lindholm ............................ | 711/118 |
| 5,924,098 | * 7/1999 | Kluge .................................. | 707/100 |
| 6,026,427 | * 2/2000 | Nishihara et al. ................... | 709/106 |

FOREIGN PATENT DOCUMENTS

| | | | |
|---|---|---|---|
| 0 806 730 | * 1/1997 | (EP) ............................... | G06F/15/16 |
| 11-85545 | * 3/1999 | (JP) ................................. | G06F/9/46 |

OTHER PUBLICATIONS

Anderson–Woll, Wait–free Parallel Algorithms for the Union–find Problem, Annual ACM Symposium on Theory of Computing, May 1991.*

Ford, Mutual Exclusion and Synchronization in Java: mimicking Win32, Dr. Dobb's Journal, v23, n1, p62(9), Jan. 1998.*

(List continued on next page.)

*Primary Examiner*—Tariq R. Hafiz
*Assistant Examiner*—Hoang-Vu Antony Nguyen-Ba
(74) *Attorney, Agent, or Firm*—Cesari and McKenna, LLP

(57) ABSTRACT

An object structure's header (40) allocates a two-bit synchronization-state field (42) solely to monitor data for implementing synchronization on that object. When the object is locked by a particular execution thread, or when one or more execution threads are waiting for a lock or notification on that object, its header contains a pointer to monitor resources in the form of a linked list of lock records (50, 52, 54) associated with the threads involved. The synchronization-state field (42) ordinarily contains an indication of whether such a linked list exists and, if so, whether its first member is associated with a thread that has a lock on the object. When a thread attempts to gain access to that linked list, it employs an atomic swap operation to place a special busy value in that lock-state field (42) and write its execution-environment pointer into the object's header (40). If the previous value of that field was not the special busy value, the thread uses the header's previous contents to perform its intended synchronization operation. Otherwise, it obtains that information through its own execution environment (44, 46, or 48) or that of the thread whose identifier the object header previously contained. When the thread completes its synchronization operation, it employs an atomic compare-and-swap operation to write the results into the object's header if that header still contains the thread identifier that the thread originally wrote there. Otherwise, it communicates that information to its successor thread if the thread identifier is different and thereby indicates that at least one successor is contending for access to the linked list.

77 Claims, 28 Drawing Sheets

OTHER PUBLICATIONS

Criscolo, How Do I Queue Java Threads? (designing multithreaded Java software), Dr Dobb's Journal, v23, n10, p127(3), Oct. 1998.*

Berg, How Do Threads Work and How Can I Create a General–purpose Event? (with Java), Dr. Dobb's Journal, v21, n11, p. 111(7), May 1991.*

Threads Library, mutex (3T), SunOS 5.6, May 8, 1997, pp. 1–2.

Threads and Locks, Java Language Specification, First Edition, web, Dec. 22, 1998, pp. 1–13.

Tom Anderson. The Performance of Spin Lock Alternatives for Shared–Memory Multiprocessors, IEEE Transactions on Parallel and Distributed Systems. 1(1), p. 6–16, Jan. 1990.

David F. Bacon, Ravi Konoru, Chet Murphy and Mauricio Serrano. Thin Locks: Featherweight Synchronization for Java. In Proc. ACM SIGPLAN '98 Conference on Programming Language Design and Implementation (PLDI), p. 258–268, Montreal, Canada Jun. 1998.

Andrew Birrell, An Introduction to Programming with Threads. Digital Systems Research Center report No. 35, 1989.

Peter A. Buhr, Michel Fortier, and Michael H. Coffin. Monitor Classification. ACM Computing Surveys, 27(1), p 63–107, Mar. 1995.

Sylvia Diechmann and Urs Holzle. A Study of the Allocation Behavior of the SPECjvm98 Java Benchmarks. Technical Report TRCS98–33, Computer Science Department, University of California, Santa Barbara, Dec. 1998.

Edsgar Dijkstra. Solution of a Problem in Concurrent Programming Control. Communications of the ACM 8(9), p 569, Aug. 1965.

Michael Greenwald and David Cheriton. The Synergy Between non–blocking Synchronization and Operating System Structure. In 2nd Symposium on Operating Systems Design and Implementation (OSDI '96), p 123–136, Seattle, WA, Oct. 1996.

Per Brinch Hansen. Monitors and Concurrent Pascal; a personal history. In Proceedings of the Second ACM SIGPLAN Conference on History of Programming Languages, p. 1–35. Published as ACM SIGPLAN Notices 28(3), Mar. 1993.

C.A.R. Hoare, Monitors: An Operating System Structuring Concept, Communications of the ACM 17(10), p. 549–557, Oct. 1974.

Andreas Krall. Efficient JavaVM Just–in–Time Compilation. In Proc. International Conference on Parallel Architectures and Compilation Techniques (PACT'98), p 12–18. Paris, France, Oct. 1998.

Andreas Krall and Mark Probst. Monitors and Exceptions: How to implement Java effiiciency. In ACM 1998 Workshop on Java for High–Performance Computing, p. 15–24, Palo Alto, CA Mar. 1998.

Leslie Lamport. A Fast Mutual Exlcusion Algorithm. ACM Transactions on Computing System 5(1), p. 1–11, Feb. 1987.

John M Mellor–Crummey and Michael L. Scott. Algorithms for Scalable Synchronization on Shared–Memory Multiprocessors. ACM Transactions on Computer Systems, 9(1), p. 21–65, 1991.

Gilles Muller, Barbara Moura, Fabrice Bellard and Charles Consel. Harissa: A Flexible and Efficient Java Environment Mixing Bytecode and Compiled Code. In Proc. of the 3rd Conference on Object–Oriented Technologies and Systems (COOTS), p. 1–20, Berkeley, CA, Jun. 1997.

John Neffinger. Which Java VM Scales best? JavaWorld, Aug. 1998, http://www.javaworld.com/javaworld/jw–08–1998/jw–08–volanomark.html. See also www.volano.com.

Todd A. Proebsting, Gregg Townsend, Patrick Bridges, John H. Hartman, Tim Newsham and Scott A. Watterson. Toba: Java For Applications–A Way Ahead of Time (WAT) Compiler. Technical Report, Dept. of Computer Science. University of Arizona Tucson, 1997.

Ali–Reza Adl–Tabatabai, Michal Cierniak, Guei–Yuan Lueh, Vishesh M. Parkh, and James M. Stichnoth. Fast, Effective Code Generation in a Just–In–Time Java Compiler. In Proc. ACM SIGPLAN ;98 Conference on Programming Language Design nad Implementation (PLDI), p. 280–290, Montreal, Canada, Jun. 1998.

* cited by examiner

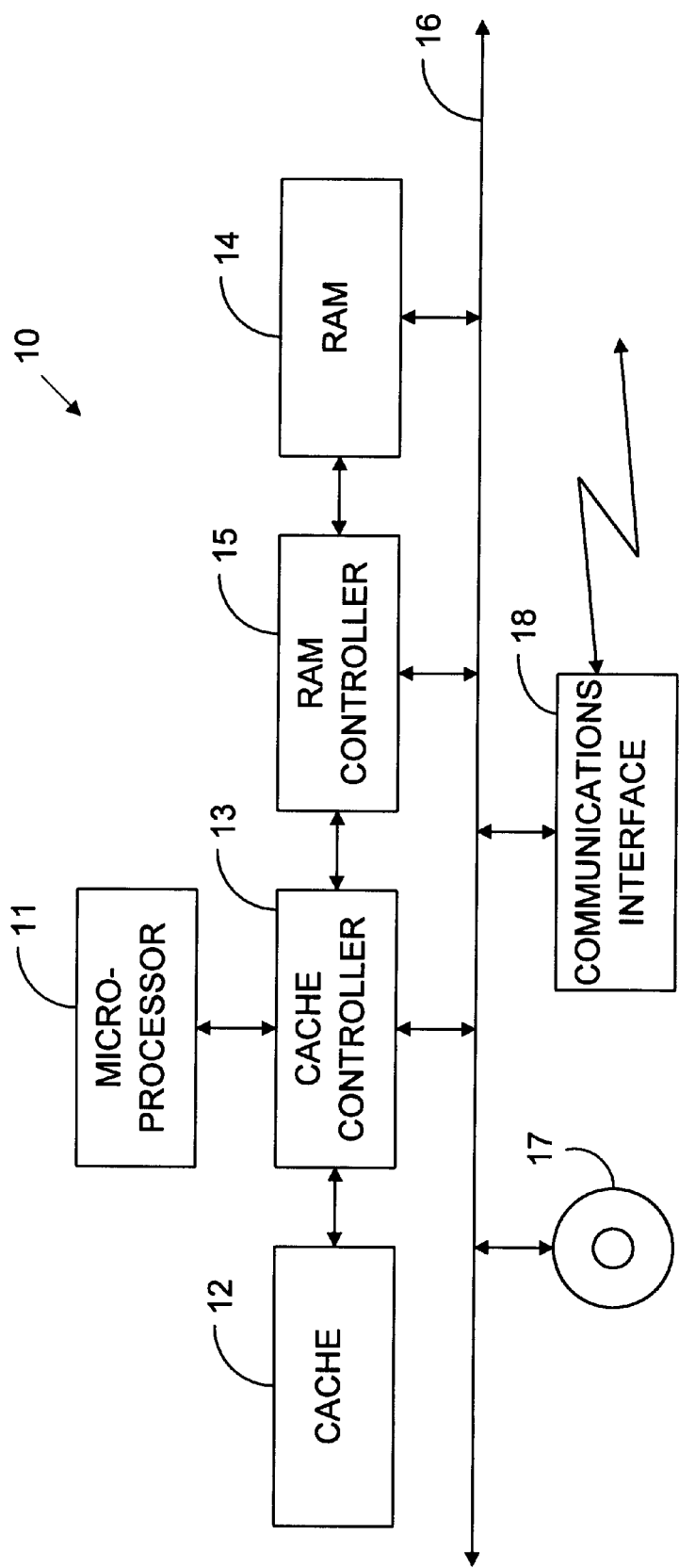

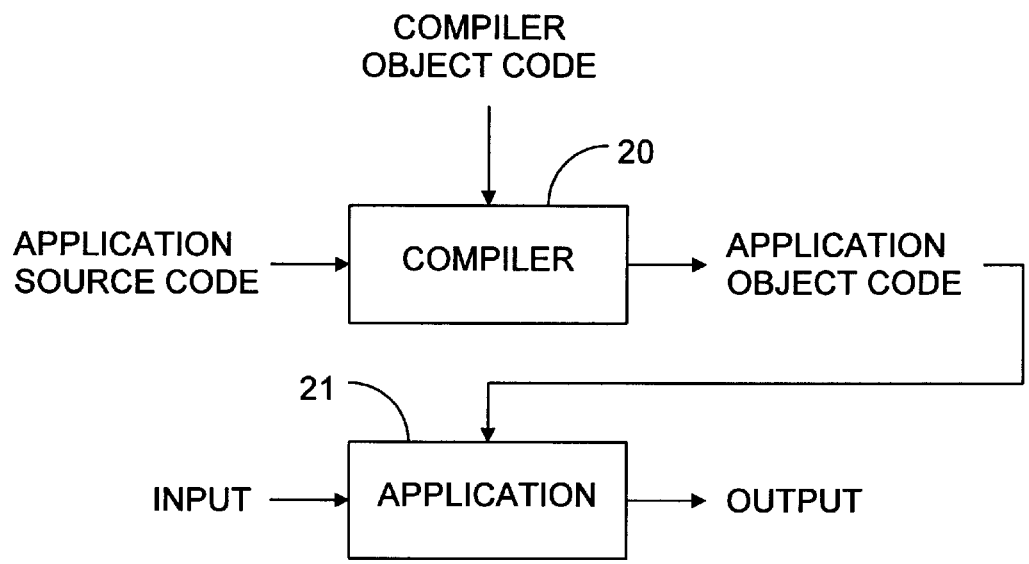

FIG. 2

```
class Bar {
        doSomething() { . . .}
        void onlyMe(Foo f) {
                synchronized(f) {doSomething();}
        }
}
```

FIG. 5

| 1 | aload_1 | // Load f onto operand stack |
| 2 | astore_2 | // Store it in local variable 2 |
| 3 | aload_2 | // Load local variable 2 (f) onto stack |
| 4 | monitorenter | // Enter the monitor associated with f |
| 5 | aload_0 | // Holding the monitor, pass this and |
| 6 | invokevirtual #5 | // call doSomething() |
| 7 | aload_2 | // Load local variable 2 (f) onto stack |
| 8 | monitorexit | // Exit the monitor associated with f |
| 9 | return | // Return normally |
| 10 | aload_2 | // In case of any throw, end up here |
| 11 | monitorexit | // Be sure to exit monitor, |
| 12 | athrow | // then rethrow the value to the invoker |

Exception table:

| From | To | Target | Type |
| 4 | 8 | 11 | any |

FIG. 6

```
1   public Class TwoThreads {
2       public static void main (String args[]) {
3           Bank b = new Bank();
4           Transferor transferor = new Transferor(b);
5           Totaler totaler = new Totaler(b);
6           transferor.start();
7           totaler.start();
8       }
9   }

10  class Bank {
11      float account_1 = 30,
12      float account_2 = 30;
13      public synchronized void transfer(float amount) {
14          account_1 -= amount;
15          account_2 += amount;
16      }
17      public synchronized float total() {return account_1 + account_2;}
18  }

19  public class Transferor extends Thread {
20      Bank b;
21      public Transferor(Bank b) { this.b = b; }
22      void run(){
23          int sign = 1;
24          for (int i = 0; i < 5; i++) {
25              sign = -1 * sign;
26              b.transfer(15.00 * sign);}
27      }
28  }

29  public class Totaler extends Thread {
30      Bank b;
31      public Totaler(Bank b) { this.b = b; }
32      void run(){
33          for (int i = 0; i < 5; i++) { System.out.println(b.total()); }
34      }
35  }
```

FIG. 4

THREAD T2 LOCKS OBJECT.
THREAD T1 STILL WAITS FOR
NOTIFICATION ON OBJECT.

THREAD T3 NOTIFIES THE OBJECT'S WAITER (T1).
THREAD T1 NOW WAITS FOR LOCK ON OBJECT.

```
1    BitField getMetaLock(ExecEnv *ee, java_lang_Object *obj) {
2            BitField busyBits = ptrAsUInt(ee) | IsBusy;
3            BitField bits = sysAtomicSwap(busyBits, (int*)getHeaderWordAddr(obj));
4            return getLockState(bits) != IsBusy ? bits : getMetaLockSlow(ee, bits);
5    }

6    BitField getMetaLockSlow(ExecEnv *ee, BitField predBits) {
7            BitField bits;
8            ExecEnv *predEE = busyEE(predBits);
9            assert(getLockState(predBits) == IsBusy);
10           mutexLock(&predEE->eeMutex);
11           if (predEE->bitsForGrab) {
12                   /* I.e., if the thread's predecessor already left its releaseBits
13                       in its execution environment. */
14                   bits = predEE->metaLockBits;    /* Copy them. */
15                   predEE->bitsForGrab = FALSE;    /* Restore initial condition. */
16                   condvarSignal(&predEE->eeCondvar);/* Wake up predecessor. */
17                   mutexUnlock(&predEE->eeMutex);
18           } else {
19                   /* I.e., if the predecessor has not left its releaseBits. */
20                   predEE->succEE = ee;     /* Identify this thread to its predecessor. */
21                   assert(!ee->gotMetaLockSlow);
22                   do {
23                           condvarWait(&predEE->eeCondvar, &predEE->eeMutex);
24                   } while (!ee->gotMetaLockSlow);   /* Wait for wake-up. */
25                   ee->gotMetaLockSlow = FALSE;     /* Restore initial condition. */
26                   mutexUnlock(&predEE->eeMutex);
27                   bits = ee->metaLockBits;
28           }
29           return bits;
30   }
```

NO META-
LOCKING IN
PROGRESS

Object:
| CLASS POINTER | |
|---|---|
| LR POINTER | $01_2$ |
| OTHER OBJECT FIELDS | |

$EE_{T1}$:
- gotMetaLock-Slow = FALSE
- bitsForGrab = FALSE
- succEE = NULL
- metaLockBits = ??
- OTHER $EE_{T1}$ FIELDS

$EE_{T2}$:
- gotMetaLock-Slow = FALSE
- bitsForGrab = FALSE
- succEE = NULL
- metaLockBits = ??
- OTHER $EE_{T2}$ FIELDS

$EE_{T3}$:
- gotMetaLock-Slow = FALSE
- bitsForGrab = FALSE
- succEE = NULL
- metaLockBits = ??
- OTHER $EE_{T3}$ FIELDS

FIG. 9B

T1 PER-
FORMS
FAST
META-
LOCK

Object:
| CLASS POINTER | |
|---|---|
| PTR TO $EE_{T1}$ | $11_2$ |
| OTHER OBJECT FIELDS | |

$EE_{T1}$:
- gotMetaLock-Slow = FALSE
- bitsForGrab = FALSE
- succEE = NULL
- metaLockBits = ??
- OTHER $EE_{T1}$ FIELDS

$EE_{T2}$:
- gotMetaLock-Slow = FALSE
- bitsForGrab = FALSE
- succEE = NULL
- metaLockBits = ??
- OTHER $EE_{T2}$ FIELDS

$EE_{T3}$:
- gotMetaLock-Slow = FALSE
- bitsForGrab = FALSE
- succEE = NULL
- metaLockBits = ??
- OTHER $EE_{T3}$ FIELDS

| | |
|---|---|
| CLASS POINTER | 11₂ |
| PTR TO EE_T3 | |
| OTHER OBJECT FIELDS | |

| EE_T1 | EE_T2 | EE_T3 |
|---|---|---|
| gotMetaLock-Slow = FALSE | gotMetaLock-Slow = TRUE | gotMetaLock-Slow = FALSE |
| bitsForGrab = FALSE | bitsForGrab = FALSE | bitsForGrab = FALSE |
| succEE = NULL | succEE = NULL | succEE = NULL |
| metaLockBits = ?? | metaLockBits = T1'S releaseBits | metaLockBits = ?? |
| OTHER EE_T1 FIELDS | OTHER EE_T2 FIELDS | OTHER EE_T3 FIELDS |

T1 STARTS META-LOCK RELEASE. IT USES THE SLOW VERSION SINCE THE OBJECT'S HEADER DOES NOT CONTAIN A POINTER TO T1'S LOCK RECORD. T1 PERFORMS SLOW RELEASE IN WHICH ITS SUCCESSOR'S IDENTITY IS AVAILABLE

FIG. 9F

| | |
|---|---|
| CLASS POINTER | 11₂ |
| PTR TO EE_T3 | |
| OTHER OBJECT FIELDS | |

| EE_T1 | EE_T2 | EE_T3 |
|---|---|---|
| gotMetaLock-Slow = FALSE | gotMetaLock-Slow = FALSE | gotMetaLock-Slow = FALSE |
| bitsForGrab = FALSE | bitsForGrab = FALSE | bitsForGrab = FALSE |
| succEE = NULL | succEE = NULL | succEE = NULL |
| metaLockBits = ?? | metaLockBits = T1'S releaseBits | metaLockBits = ?? |
| OTHER EE_T1 FIELDS | OTHER EE_T2 FIELDS | OTHER EE_T3 FIELDS |

WITH T1'S releaseBits NOW AVAILABLE, T2 COMPLETES SLOW META-LOCK BY RETURNING T1'S releaseBits

FIG. 9G

| gotMetaLock-Slow = FALSE |
|---|
| bitsForGrab = FALSE |
| succEE = NULL |
| metaLockBits = ?? |
| OTHER EE_T1 FIELDS |

| gotMetaLock-Slow = FALSE |
|---|
| bitsForGrab = TRUE |
| succEE = NULL |
| metaLockBits = T2'S releaseBits |
| OTHER EE_T2 FIELDS |

| gotMetaLock-Slow = FALSE |
|---|
| bitsForGrab = FALSE |
| succEE = NULL |
| metaLockBits = ?? |
| OTHER EE_T3 FIELDS |

| CLASS POINTER | |
|---|---|
| PTR TO EE_T3 | 11_2 |
| OTHER OBJECT FIELDS | |

T2 STARTS SLOW META-LOCK RELEASE, TAKING THE BRANCH REQUIRED WHEN IT DOES NOT KNOW ITS SUCCESSOR

FIG. 9H

| gotMetaLock-Slow = FALSE |
|---|
| bitsForGrab = FALSE |
| succEE = NULL |
| metaLockBits = ?? |
| OTHER EE_T1 FIELDS |

| gotMetaLock-Slow = FALSE |
|---|
| bitsForGrab = FALSE |
| succEE = NULL |
| metaLockBits = T2'S releaseBits |
| OTHER EE_T2 FIELDS |

| gotMetaLock-Slow = FALSE |
|---|
| bitsForGrab = FALSE |
| succEE = NULL |
| metaLockBits = ?? |
| OTHER EE_T3 FIELDS |

| CLASS POINTER | |
|---|---|
| PTR TO EE_T3 | 11_2 |
| OTHER OBJECT FIELDS | |

T3 RESUMES SLOW META-LOCK, FINDING THAT releaseBits from T2's COMPLETED SYNC OP ARE ALREADY AVAILABLE, AND COMPLETES THE METALOCK OPERATION BY RETURNING T2'S releaseBits

FIG. 9I

| gotMetaLock-Slow = FALSE |
|---|
| bitsForGrab = FALSE |
| succEE = NULL |
| metaLockBits = ?? |
| OTHER $EE_{T1}$ FIELDS |

| gotMetaLock-Slow = FALSE |
|---|
| bitsForGrab = FALSE |
| succEE = NULL |
| metaLockBits = T1'S releaseBits |
| OTHER $EE_{T2}$ FIELDS |

| gotMetaLock-Slow = FALSE |
|---|
| bitsForGrab = FALSE |
| succEE = NULL |
| metaLockBits = ?? |
| OTHER $EE_{T3}$ FIELDS |

| CLASS POINTER | $11_2$ |
|---|---|
| PTR TO $EE_{T3}$ | |
| OTHER OBJECT FIELDS | |

AWAKENED BY ITS SUCCESSOR'S METALOCK COMPLETION, T2 COMPLETES SLOW METALOCK RELEASE

FIG. 9J

| gotMetaLock-Slow = FALSE |
|---|
| bitsForGrab = FALSE |
| succEE = NULL |
| metaLockBits = ?? |
| OTHER $EE_{T1}$ FIELDS |

| gotMetaLock-Slow = FALSE |
|---|
| bitsForGrab = FALSE |
| succEE = NULL |
| metaLockBits = T1'S releaseBits |
| OTHER $EE_{T2}$ FIELDS |

| gotMetaLock-Slow = FALSE |
|---|
| bitsForGrab = FALSE |
| succEE = NULL |
| metaLockBits = ?? |
| OTHER $EE_{T3}$ FIELDS |

| CLASS POINTER | $01_2$ |
|---|---|
| LR POINTER | |
| OTHER OBJECT FIELDS | |

T3 PERFORMS FAST METALOCK RELEASE

```
1   void releaseMetaLock(ExecEnv *ee, java_lang_Object *obj, BitField releaseBits) {
2       BitField busyBits = ptrAsUInt(ee) | IsBusy;
3       BitField lockBits = sysCompareAndSwap(releaseBits, busyBits,
4                                             (int*)getHeaderWordAddr(obj));
5       if (lockBits != busyBits) releaseMetaLockSlow(ee, releaseBits);
6   }

7   void releaseMetaLockSlow(ExecEnv *ee, BitField releaseBits) {
8       mutexLock(&ee->eeMutex);
9       if (ee->succEE) {
10          /* I.e., if the thread's successor has already identified itself */
11          assert(!ee->succEE->bitsForGrab);
12          assert(!ee->bitsForGrab);
13          assert(!ee->succEE->gotMetaLockSlow);
14          ee->succEE->metaLockBits = releaseBits; /* Transfer releaseBits
15                                                     to successor. */
16          ee->succEE->gotMetaLockSlow = TRUE; /* Show that they're valid. */
17          ee->succEE = NULL;  /* Restore initial condition. */
18          mutexUnlock(&ee->eeMutex);
19          condvarSignal(&ee->eeCondvar);      /* Wake up successor. */
20      } else {
21          /* I.e., if the predecessor has not identified itself. */
22          ee->metaLockBits = releaseBits;  /* Store releaseBits for successor. */
23          ee->bitsForGrab = TRUE;          /* Show that they're valid. */
24          do {
25              condvarWait(&ee->eeCondvar, &ee->eeMutex);
26          } while (ee->bitsForGrab);
27          mutexUnlock(&ee->eeMutex);
28      }
29  }
```

FIG. 10

THREAD T1 LOCKS OBJECT

THREAD T2 BEGINS WAIT FOR LOCK ON OBJECT.

THREAD T1 RELEASES LOCK

THREAD T2 LOCKS OBJECT

THREAD T2 RELEASES LOCK

BUSY-WAIT-FREE SYNCHRONIZATION

BACKGROUND OF THE INVENTION

The present invention is directed to compiling and interpreting computer programs. It particularly concerns synchronization between execution threads.

FIG. 1 depicts a typical computer system 10. A microprocessor 11 receives data, and instructions for operating on them, from on-board cache memory or further cache memory 12, possibly through the mediation of a cache controller 13, which can in turn receive such data from system read/write memory ("RAM") 14 through a RAM controller 15, or from various peripheral devices through a system bus 16.

The RAM 14's data and instruction contents will ordinarily have been loaded from peripheral devices such as a system disk 17. Other sources include communications interface 18, which can receive instructions and data from other computer systems.

The instructions that the microprocessor executes are machine instructions. Those instructions are ultimately determined by a programmer, but it is a rare programmer who is familiar with the specific machine instructions in which his efforts eventually result. More typically, the programmer writes higher-level-language "source code" from which a computer software-configured to do so generates those machine instructions, or "object code."

FIG. 2 represents this sequence. FIG. 2's block 20 represents a compiler process that a computer performs under the direction of compiler object code. That object code is typically stored on the system disk 17 or some other machine-readable medium and by transmission of electrical signals is loaded into RAM 14 to configure the computer system to act as a compiler. But the compiler object code's persistent storage may instead be in a server system remote from the machine that performs the compiling. The electrical signals that carry the digital data by which the computer systems exchange the code are exemplary forms of carrier waves transporting the information.

The compiler converts source code into further object code, which it places in machine-readable storage such as RAM 14 or disk 17. A computer will follow that object code's instructions in performing an application 21 that typically generates output from input. The compiler 20 is itself an application, one in which the input is source code and the output is object code, but the computer that executes the application 21 is not necessarily the same as the one that performs the compiler process.

The source code need not have been written by a human programmer directly. Integrated development environments often automate the source-code-writing process to the extent that for many applications very little of the source code is produced "manually." As will be explained below, moreover, the "source" code being compiled may sometimes be low-level code, such as the byte-code input to the Java™ virtual machine, that programmers almost never write directly. (Sun, the Sun Logo, Sun Microsystems, and Java are trademarks or registered trademarks of Sun Microsystems, Inc., in the United States and other countries.) Moreover, although FIG. 2 may appear to suggest a batch process, in which all of an application's object code is produced before any of it is executed, the same processor may both compile and execute the code, in which case the processor may execute its compiler application concurrently with—and, indeed, in a way that can be dependent upon—its execution of the compiler's output object code.

So the sequence of operations by which source code results in machine-language instructions may be considerably more complicated than one may infer from FIG. 2. To give a sense of the complexity that can be involved, we discuss by reference to FIG. 3 an example of one way in which various levels of source code can result in the machine instructions that the processor executes. The human application programmer produces source code 22 written in a high-level language such as the Java programming language. In the case of the Java programming language, a compiler 23 converts that code into "class files." These predominantly include routines written in instructions, called "byte codes" 24, for a "virtual machine" that various processors can emulate under appropriate instructions. This conversion into byte codes is almost always separated in time from those codes' execution, so that aspect of the sequence is depicted as occurring in a "compile-time environment" 25 separate from a "run-time environment" 26, in which execution occurs.

Most typically, the class files are run by a processor under control of a computer program known as a virtual machine 27, whose purpose is to emulate a machine from whose instruction set the byte codes are drawn. Much of the virtual machine's action in executing these codes is most like what those skilled in the art refer to as "interpreting," and FIG. 3 shows that the virtual machine includes an "interpreter" 28 for that purpose. The resultant instructions typically involve calls to a run-time system 29, which handles matters such as loading new class files as they are needed and performing "garbage collection," i.e., returning allocated memory to the system when it is no longer needed.

Many virtual-machine implementations also actually compile the byte codes concurrently with the resultant object code's execution, so FIG. 3 depicts the virtual machine as additionally including a "just-in-time" compiler 30. It may be that the resultant object code will make low-level calls to the run-time system, as the drawing indicates. In any event, the code's execution will include calls to the local operating system 31.

It is not uncommon for a virtual-machine implementation both to compile and to interpret different parts of the same byte-code program. And, although the illustrated approach of first compiling the highlevel code into byte codes is typical, the Java programming language is sometimes compiled directly into native machine code. So there is a wide range of mechanisms by which source code—whether high-level code or byte code—can result in the actual native machine instructions that the hardware processor executes. The teachings to be set forth below can be used in all of them, many of which, as was just explained, do not fit neatly into either the compiler or interpreter category. So we will adopt the term compiler/interpreter to refer to all such mechanisms, whether they be compilers, interpreters, hybrids thereof, or combinations of any or all of these.

In actual operation, the typical computer program does not have exclusive control over the machine whose operation it directs; a typical user concurrently runs a number of application programs. Of course, a computer that is not a multiprocessor machine can at any given instant be performing the instructions of only one program, but a typical multi-tasking approach employed by single-processor machines is for each concurrently running program to be interrupted from time to time to allow other programs to run, with the rate of such interruption being high enough that the programs' executions appear simultaneous to the human user.

The task of scheduling different applications programs' executions typically falls to the computer's operating system. In this context, the different concurrently running programs are commonly referred to as different "processes." In addition to scheduling, the operating system so operates the computer that the various processes' physical code, data, and stack spaces do not overlap. So one process cannot ordinarily interfere with another. The only exceptions to this rule occur when a process specifically calls an operating-system routine ("makes a system call") intended for inter-process communication.

The operating system's scheduling function can be used to divide processor time not only among independent processes but also among a single process's different "threads of execution." Different execution threads are like different processes in that the operating system divides time among them so that they can take turns executing. They therefore have different call stacks, and the operating system has to swap out register contents when it switches between threads. But a given process's different execution threads share the same data space, so they can have access to the same data without operating-system assistance. Indeed, they also share the same code space and can therefore execute the same instructions, although different threads are not in general at the same point in those instructions' execution at the same time. By using threads to take advantage of the operating system's scheduling function, the programmer can simplify the task of programming a plurality of concurrent operations; he does not have to write the code that explicitly schedules the threads' concurrent executions.

FIG. 4 is a Java programming language listing of a way in which a programmer may code concurrent threads. The steps in that drawing's fourth and fifth lines create new instances of the classes Transferor and Totaler and assign these objects to variables transferor and totaler, respectively. The Transferor and Totaler classes can be used to create new threads of control, because they extend the class Thread, as the nineteenth and twenty-ninth lines indicate. When a Thread object's start( ) method is called, its run( ) method is executed in a new thread of control. So the sixth line's transferor.start( ) statement results in execution of the method, defined in the twenty-second through twenty-seventh lines, that transfers an amount back and forth between two member variables, account_1 and account_2, of an object of the class Bank. And the seventh line's totaler.start( ) statement results in execution of a method, defined in the thirty-second through thirty-fourth lines, that prints out the total of those member variables' values. Note that neither method refers to the other; by taking advantage of the programming language's thread facility, the programmer is relieved of the burden of scheduling.

There is not in general any defined timing between two concurrently running threads, and this is often the intended result: the various threads are intended to execute essentially independently of each other. But there are also many instances in which total independence would yield unintended results. For example, the b.transfer( ) method is intended to simulate internal transfers back and forth between two of a bank's accounts, while the b.total( ) method is intended to print out the total of the bank's account balances. Clearly, completely internal transfers should not change the bank's account total. But consider what would happen if the transferor thread's execution is interrupted between the fourteenth and fifteenth lines, i.e., between the time the amount is subtracted from one account and the time it is added to the other account. Intervening execution of the totaler thread could print the bank's total out as a value different from the one that the simulation is intended to represent: the state of the simulated bank would be inconsistent.

To prevent such inconsistent results, mechanisms for inter-thread communication have been developed. In the example, the thirteenth and seventeenth lines include the "synchronized" modifier. This directs the compiler/interpreter to synchronize its implementation of the transfer( ) and total( ) methods: before a thread begins execution of either method, it must obtain an exclusive "lock" on the object on which the instance method is called. So no other thread can execute a synchronized method on that object until the first thread releases its lock. If a transferor thread is in the midst of executing b.transfer( ), for instance, it must have a lock on object b, and this means that the totaler thread will be blocked from executing b.total( ) until the transferor thread's execution of transfer( ) has been completed.

Those familiar with the Java programming language will additionally recognize that a thread can lock an object even when it is not executing one of that object's synchronized methods. FIG. 5 is a listing of source code for a class Bar containing two methods. The "synchronized" statement in the onlyMe( ) method indicates that an execution must obtain a lock on the object f before it executes the subsequent code block, which calls the doSomething( ) method. FIG. 6 shows a possible result of compiling the onlyMe( ) method to Java virtual machine byte-code instructions. The fourth and eighth lines contain the mnemonics for the byte codes that direct the executing virtual machine respectively to acquire and release a lock on object f, which the topmost evaluation-stack entry references.

The particular way in which the compiler/interpreter obtains a lock on an object (also referred to as acquiring a "monitor" associated with the object) depends on the particular compiler/interpreter implementation. (It is important at this point to recall that we are using the term compiler/interpreter in a broad sense to include, for instance, the functions performed by a Java virtual machine in executing the so-called byte code into which the Java Programming language code is usually compiled; it is that process that implements monitor acquisition in response to the byte code whose mnemonic is monitor enter. Still, Java programming language code also is occasionally compiled directly into native machine code without the intervening step of byte-code generation. Indeed, monitor acquisition and release in the case of FIG. 4's program would be performed without any explicit byte-code instruction for it, such as monitorexit, even if, as is normally the case, most of that code is compiled into byte code.)

The most natural way to implement a monitor is to employ available operating-system facilities for inter-thread and -process communication. Different operating systems provide different facilities for this purpose, but most of their applications-programming interfaces ("APIs") provide routines for operating on system data structures called "mutexes" (for "mutual exclusion"). A thread or process makes a system call by which it attempts to acquire a particular mutex that it and other threads and/or processes associate with a particular resource. The nature of mutex operations is such that an attempt to acquire a mutex is delayed (or "blocked") if some other process or thread currently owns that particular mutex; when a mutex acquisition attempt completes, the process or thread that performed the acquisition may safely assume that no other process or thread will complete an acquisition operation until the current process or thread releases ownership of the mutex. If all processes or threads that access a shared resource follow a convention of considering a particular shared mutex to "protect" the resource—i.e., if every process or thread accesses the resource only when it owns the mutex—then they will avoid accessing the resource concurrently.

The system-mutex approach has been employed for some time and has proven effective in a wide variety of applications. But it must be used judiciously if significant performance penalties or programming difficulties are to be avoided. Since the number of objects extant at a given time during a program's execution can be impressively large, for instance, allocating a mutex to each object to keep track of its lock state would result in a significant run-time memory cost.

So workers in the field have attempted to minimize any such disincentives by adopting various monitor-implementation approaches that avoid storage penalties to as great an extent as possible. One approach is to avoid allocating any monitor space to an object until such time as a method or block synchronized on it is actually executed. When a thread needs to acquire a lock on an object under this approach, it employs a hash value for that object to look it up in a table containing pointers to monitor structures. If the object is already locked or currently has some other need for a monitor structure, the thread will find that monitor structure by consulting the table and performing the locking operation in accordance with that monitor structure's contents. Otherwise, the thread allocates a monitor structure and lists it in the table. When synchronization activity on the object ends, the monitor structure's space is returned to the system or a pool of monitor structures that can be used for other objects.

Since this approach allocates monitor structures only to objects that currently are the subject of synchronization operations, the storage penalty is minimal; although the number of extant objects at any given time can be impressively large, the number of objects that a given thread holds locked at one time is ordinarily minuscule in comparison, as is the number of concurrent threads. Unfortunately, although this approach essentially eliminates the excessive storage cost that making objects lockable could otherwise exact, it imposes a significant performance cost. Specifically, the time cost of the table lookup can be significant. It also presents scalability problems, since there can be contention for access to the table itself; the table itself must therefore be locked and thus can cause a bottleneck if the number of threads becomes large.

And the nature of object-oriented programming tends to result in extension of this performance cost beyond single-thread programming. There are classes of programming objects that are needed time and again in a wide variety of programming projects, and legions of programmers have duplicated effort in providing the same or only minimally different routines. One of the great attractions of object-oriented programming is that it lends itself to the development of class libraries. Rather than duplicate effort, a programmer can employ classes selected from a library of classes that are widely applicable and thoroughly tested.

But truly versatile class libraries need to be so written that each class is "thread safe." That is, any of that class's methods that could otherwise yield inconsistent results when methods of an object of that class are run in different threads will have to be synchronized. And unless the library provides separate classes for single-thread use, the performance penalty that synchronized methods exact will be visited not only upon multiple thread programs but upon single-thread programs as well.

An approach that to a great extent avoids these problems is proposed by Bacon et al., "Thin Locks: Feather Weight Synchronization for Java," *Proc. ACM SIGPLAN'98*, Conference on Programming Language Design and Implementation (PLDI), pp. 258–68, Montreal, June 1998. That approach is based on the recognition that most synchronization operations are locking or unlocking operations, and most such operations are uncontended, i.e., involve locks on objects that are not currently locked or are locked only by the same thread. (In the Java virtual machine, a given thread may obtain multiple simultaneous locks on the same object, and a count of those locks is ordinarily kept in order to determine when the thread no longer needs exclusive access to the object.) Given that these are the majority of the situations of which the monitor structure will be required to keep track, the Bacon et al. approach is to include in the object's header a monitor structure that is only large enough (twenty-four bits) to support uncontended locking. That monitor includes a thread identifier, a lock count, and a "monitor shape bit," which indicates whether that field does indeed contain all of the monitor information currently required.

When a thread attempts to obtain a lock, it first inspects the object's header to determine whether the monitor-shape bit, lock count, and thread identifier are all zero and thereby indicate that the object is unlocked and subject to no other synchronization operation. If they are, as is usually the case, the thread places an index identifying itself in the thread-identifier field, and any other thread similarly inspecting that header will see that the object is already locked. It happens that in most systems this header inspection and conditional storage can be performed by a single atomic "compare-and-swap" operation, so obtaining a lock on the object consists only of a single atomic operation if no lock already exists. If the monitor-shape bit is zero and the thread identifier is not zero but identifies the same thread as the one attempting to obtain the lock, then the thread simply retains the lock but performs the additional step of incrementing the lock count. Again, the lock-acquisition operation is quite simple. These two situations constitute the majority of locking operations.

But the small, twenty-four-bit header monitor structure does not have enough room for information concerning contended locking; there is no way to list the waiting threads so that they can be notified that the first thread has released the lock by writing zeroes into that header field. In the case of a contended lock, this forces the Bacon et al. arrangement to resort to "spin locking," also known as "busy-waits." Specifically, a thread that attempts to lock an object on which some other thread already has a lock repeatedly performs the compare-and-swap operation on the object-header monitor structure until it finds that the previous lock has been released. This is obviously a prodigal use of processor cycles, but it is necessary so long as the monitor structure does not have enough space to keep track of waiting threads.

When the previously "spinning" thread finally does obtain access to the object, the Bacon et al. arrangement deals with the busy-wait problem by having that thread allocate a larger monitor structure to the object, placing an index to the larger structure in the header, and setting the object's monitor-shape bit to indicate that it has done so, i.e., to indicate that the monitor information now resides outside the header. Although this does nothing to make up for the thread's previous spinning, it is based on the assumption that the object is one for which further lock contention is likely, so the storage penalty is justified by the future spinning avoidance that the larger structure can afford.

A review of the Bacon et al. approach reveals that its performance is beneficial for the majority of synchronization operations, i.e., for uncontested or nested locks. But it still presents certain difficulties. In the first place, although the object-header-resident monitor structure is indeed relatively small in comparison with a fuller-featured monitors, it still consumes twenty-four bits in each and every object. Since this is three bytes out of an average object size of, say, forty bytes, that space cost is non-negligible. Additionally, the relatively small monitor size forces a compromise between monitor size and contention performance. As was mentioned above, initial contention results in the significant performance penalty that busy-waits represent. The Bacon et al. arrangement avoids such busy-waits for a given object after the first contention, but only at the expense of using the larger monitor structure, which needs to remain allocated to that object unless the previously contended-for object is again to be made vulnerable to busy-waits. In other words, the Bacon et al. arrangement keeps the object's monitor structure "inflated" because the object's vulnerability to busy-waits would return if the monitor were "deflated."

Finally, the only types of synchronization operations with which the Bacon et al. approach can deal are the lock and unlock operations. It provides no facilities for managing other synchronization operations, such as those known as "wait," "notify," and "notifyAll"; it assumes the existence of heavy-weight monitor structures for those purposes.

SUMMARY OF THE INVENTION

We have devised a method that can be used for a wide variety of synchronization operations but avoids busy-waits, imposes much less per-object storage-space cost, and exhibits better worst-case storage behavior. Compiler/interpreters employing this approach allocate object structures in which the header includes a synchronization field, which can be as small as two bits, that can contain a code representing the object's synchronization state. The codes employed by the compiler/interpreter in the example to be described below, for instance, variously indicate that the object is locked, that threads are waiting to lock it or be "notified on" it, and that there are no locks or waiters.

Since this information is not alone enough to contain all of the information concerning the object's synchronization information when various threads are synchronized on the object, synchronization operations will involve access to monitor structures temporarily assigned to the object to support those operations. In accordance with the present invention, a thread precedes access to such structures with what we call "meta-lock" acquisition. In that operation, a given thread attempting to begin a monitor-access operation performs a swap operation in which it replaces the synchronization-state-field contents with a "busy"-valued synchronization-state code whose meaning is that the object is what we call "meta-locked," i.e., that a thread has acquired exclusive access to the resources needed to support synchronization on the object. In the same operation it replaces the contents of an identifier field in the object's header with an identifier of the thread performing the operation, i.e., of the thread attempting to acquire a meta-lock. In performing that swap the thread learns whether the object is already meta-locked and, if so, the identity of the immediate-predecessor contender for the meta-lock.

Preferably, the header field in which the thread identifier is thus written contains other information when the object is not meta-locked; header information swapped out (i.e., atomically read and displaced) by the first meta-lock-acquiring thread in writing its thread identifier into the object header preferably includes any information that the acquiring thread's monitor-access operation will modify and/or need as input. So the only part of the header required to be dedicated solely to supporting synchronization is a minimal (typically two-bit) synchronization-state field.

If the synchronization-state code swapped out of the object's header in the meta-lock-acquisition operation is not the predetermined busy code—i.e., if there was not already a meta-lock in place—then the given thread concludes that it possesses the object's meta-lock, i.e., that it has exclusive access to the monitor data for that object. In that case, the monitor-access operation proceeds in accordance with the swapped-out synchronization-state field's contents and, preferably, with the header information displaced by that meta-lock-acquisition operation's swapping a thread identifier for prior header contents.

If the code swapped out of the header is the busy code, on the other hand, the given thread concludes that some other thread already owns the meta-lock on the object. So it must delay performance of the monitor-access operation until it receives ownership from its predecessor, which may be the current owner or some intervening contender for the meta-lock. The given thread additionally concludes that it will not be able to consult the object header to read the synchronization state in which its predecessor leaves the object; if the predecessor were to record in the object header the synchronization state in which that predecessor's monitor-access operation leaves the object, it would thereby erase the busy code that the given thread has placed there, so any successor—i.e., any thread that attempts to acquire the meta-lock before the given thread releases it—would not be apprised of the meta-lock to which the given thread will succeed when its predecessor releases the meta-lock. So that thread arranges with its predecessor to receive that information by inter-thread communication through those threads' respective "execution environments," i.e., through the data structures that represent those threads' states.

Specifically, the given thread waits, if necessary, for its predecessor thread to write into the given or predecessor thread's execution environment the value that the synchronization-state word should have after the predecessor's monitor-access operation has been completed. When a thread completes a monitor-access operation in accordance with the present invention (as the given thread's predecessor has), it performs a meta-lock-release operation in which it uses a compare-and-swap operation. In that operation it places the synchronization-state-code results of its just-completed monitor-access operation in the object header's synchronization-state field if that inspection reveals there has been no contender for the meta-lock. If there has been such a contender, though, the meta-lock-releasing thread places that code—and preferably other information as well—in its own execution environment if its immediate successor has not identified itself to the meta-lock-releasing thread by writing that successor's thread identifier into the releasing thread's execution environment.

So the given thread preferably first inspects the predecessor thread's execution environment for an indication that the predecessor's execution environment contains that code. If a thread performing the meta-lock-acquisition operation finds that the predecessor thread has not yet placed that information into that predecessor's execution environment, it places its thread identifier in the predecessor's execution environment and suspends itself. Eventually, its predecessor completes its monitor-access operation and finds in its meta-lock-release operation's compare-and-swap step that it has a contending successor, namely, the now-suspended given thread. The predecessor responds by determining whether the given thread has identified itself, in the manner just described. Since it has, the predecessor places the synchronization-state-code results of its now-finished monitor-access operation in the given thread's execution environment and arranges for that thread to be reactivated so that it can read the information thereby transferred. When the given thread is thereby reactivated, it performs its monitor-access operation, using the information thereby obtained.

Note that if several threads all attempt to acquire an unlocked meta-lock at approximately the same instant, the atomicity guarantee of the atomic swap instruction will impose an order on these threads. The thread that is first will read the original (unlocked) lock-word contents. The second thread will read the lock word written by the first thread and therefore know that the object is meta-locked, and, further, that the first thread is its predecessor. The third thread finds the second thread as its predecessor, and so on. Each thread in this order (other than the last) will discover that it is not the last thread, and it will "hand off" the meta-lock to its successor, passing through their execution environments the data that it would otherwise have written into the object header's lock word. That is, the successor will own the meta-lock, and it will proceed as if it had read from the object header's lock word the information that the predecessor has instead passed to it through one or the other of their execution environments.

As the description below will show, this approach is largely independent of the particular type of monitor structure that it guards and can beneficially be used with monitor structures that can be implemented on little more than a per-thread basis. By using a thread-identifier swap to contend for a meta-lock, the meta-lock-acquisition operation automatically sequences the meta-lock contenders on a first-come, first-served basis. Also, this approach takes advantage of the fact that each thread can be performing only one locking operation at a time; it uses the thread's execution environment to pass header information from one meta-lock-contending thread to the next. This enables it to avoid the need to reserve exclusive header space for any monitor data other than the minimal synchronization-state code. With little performance penalty, therefore, this approach minimizes the storage cost of implementing a monitor and does so in a way that is applicable to a variety of synchronization operations.

BRIEF DESCRIPTION OF THE DRAWINGS

The invention description below refers to the accompanying drawings, of which:

FIG. 1, described above, is a block diagram of a computer system in which the present invention's teachings can be employed;

FIG. 2, described above, is a block diagram illustrating the relationship between a compiler, source code, and object code;

FIG. 4, described above, is a listing of a Java programming language program that uses a synchronized method;

FIG. 5, described above, is a listing of a simple Java programming language program;

FIG. 6, described above, is a listing of the byte code into which FIG. 5's code would typically be compiled;

FIG. 8 is a simplified C-language listing of the procedure employed for acquiring a meta-lock on the monitor resources;

FIGS. 9A–J are diagrams of an object structure and various threads' execution environments showing the results of meta-lock-acquisition and -release operations;

FIG. 10 is a simplified C-language listing of a routine for releasing a meta-lock in accordance with the present invention.

DETAILED DESCRIPTION OF AN ILLUSTRATIVE EMBODIMENT

Before we discuss the present invention's approach to meta-locking, we will consider some monitor-access operations that our meta-locking approach can be used to guard. But those operations are only exemplary; the present invention's teachings neither depend greatly on nor dictate the nature of the monitor-access operations with which the meta-locking is used or on the monitor structures that support those operations.

Figure 3:
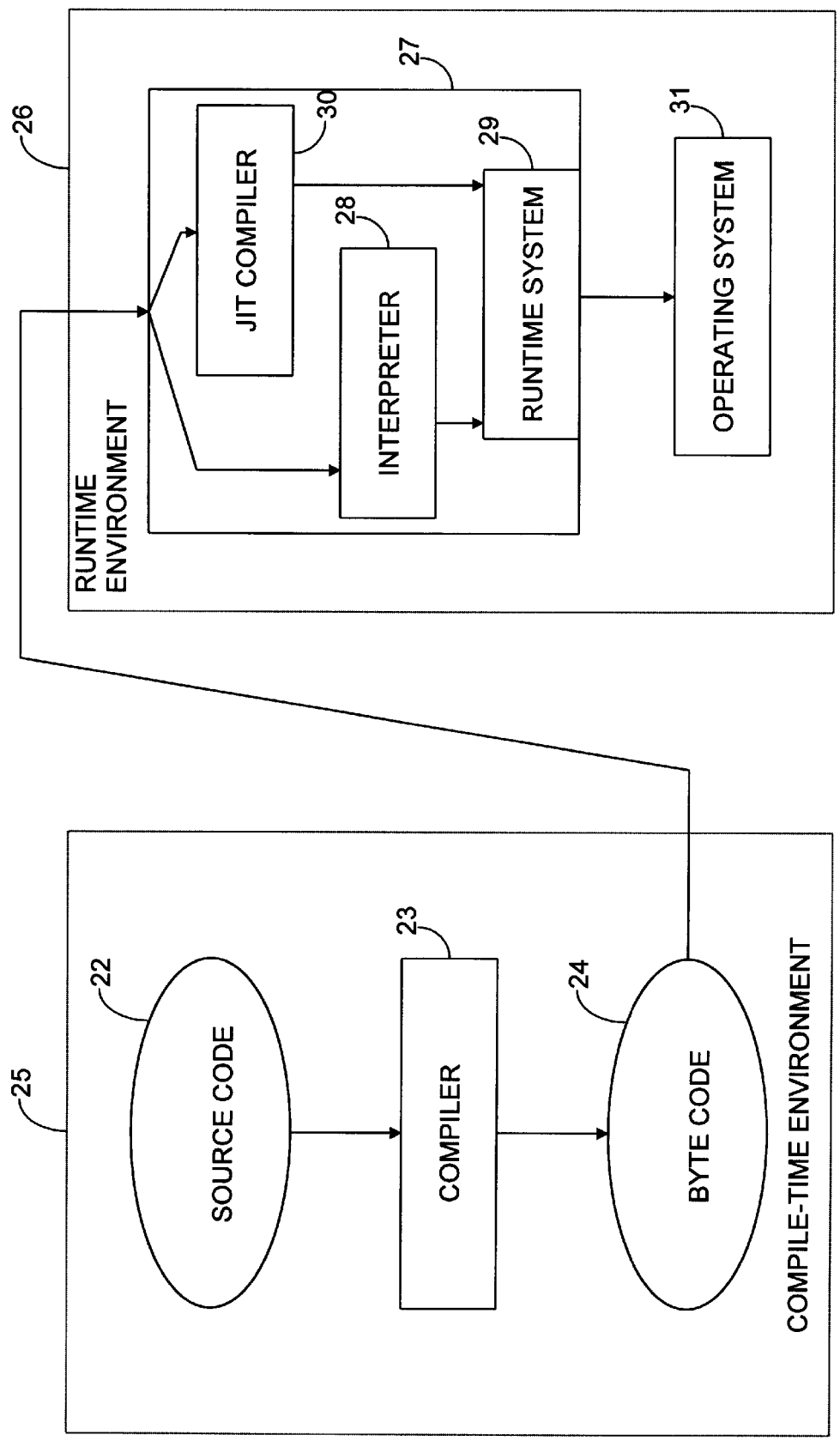
FIG. 3, described above, is a block diagram illustrating a more-complex mechanism for converting source code into object code and executing the object code.
Figure 7A:
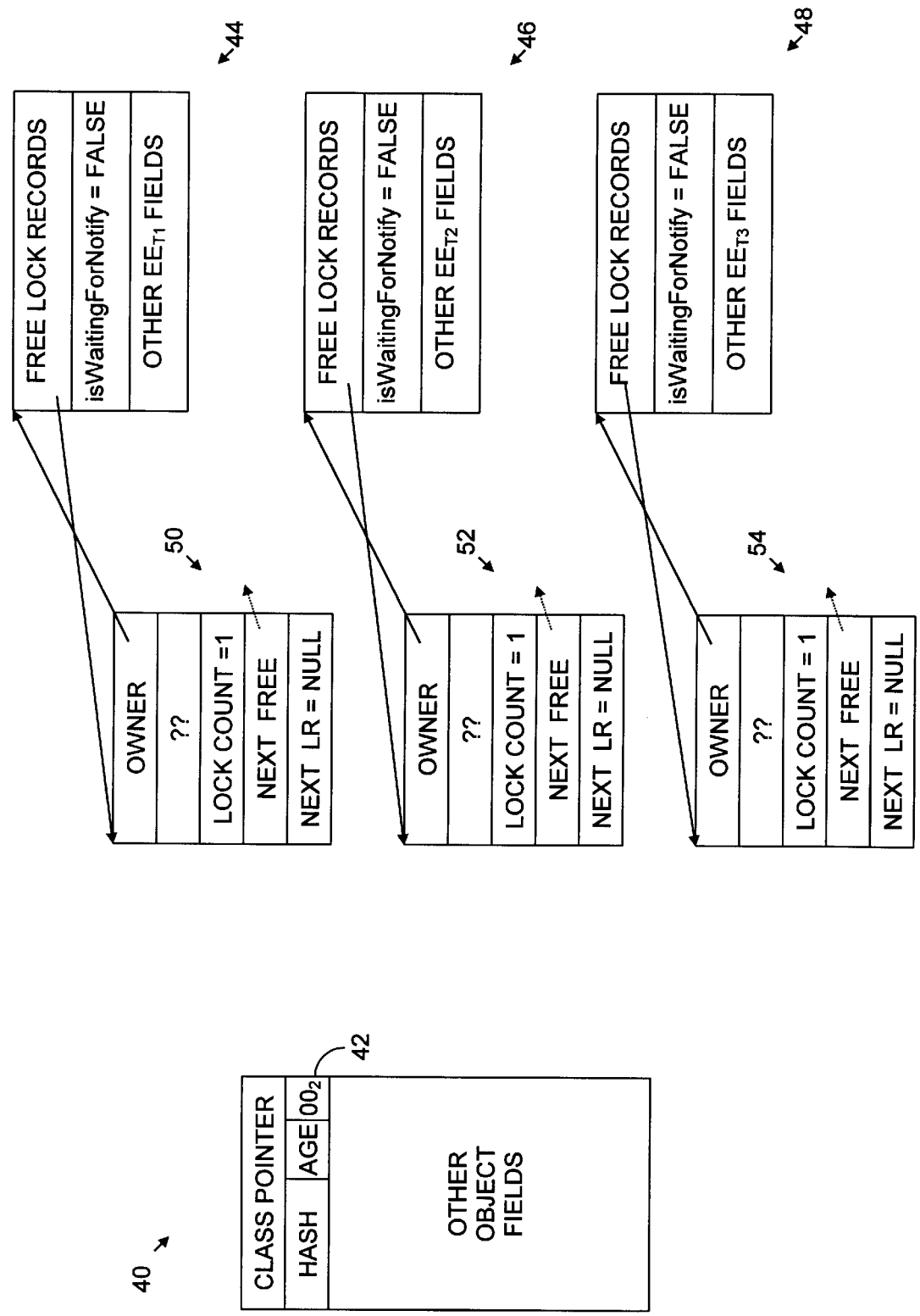
FIGS. 7A–K are diagrams of monitor resources as they change during a sequence of synchronization operations in which there is no contention for those resources.

In FIG. 7A, an object structure 40 includes memory locations in which the information related specifically to a particular object is principally stored. The "other object fields" portion contains the object's data members. In addition to these data members, which the programmer will have explicitly specified in defining the instance data members of the object's class, the object structure will typically include further, housekeeping information in a part of the data structure typically referred to as a "header."

The contents and format of the header structure depend on the particular virtual-machine implementation. For the sake of example, we assume that the header consists of two thirty-two-bit words. The first word is a pointer to an object representing the class to which the object belongs. The second word includes a hash field and an age field. If the object's hash-value-assigning method is called, the hash field contains the resultant value. That value thereafter remains unchanged, being used for purposes such as finding the object's entries in various hash tables. The age field indicates how many times the memory allocated to the object has been considered for garbage collection, i.e., how many times the virtual machine's run-time system has decided that the operating system should not reclaim the memory space allocated to the object structure. In accordance with the present invention, the header also includes a synchronization-state field 42, which in the illustrated embodiment is also part of the second word and is only two bits wide. For reasons that will become apparent, we refer to the second word as the "lock word" and to its hash and age fields together as the "identifier" field.

In the illustrated environment, the $00_2$ synchronization-state-field value that FIG. 7A depicts indicates that no thread is yet synchronized on the object: no lock has been acquired on the object, and there are no threads waiting for a lock or for what will presently be described as "notification" on it. We do assume, though, that three threads T1, T2, and T3 are currently running and will become synchronized on it. FIG. 7A therefore includes representations of data structures 44, 46, and 48, known as thread "execution environments," where the operating system stores data concerning those threads' states. (The drawings refer to execution environments 44, 46, and 48 as "$EE_{T1}$," "$EE_{T2}$," and "$EE_{T3}$,"

respectively.) Whereas the number of objects for which memory is allocated at any given time can be extremely large, the number of threads existing at a given time is typically quite small. Execution-environment size is therefore relatively unimportant in comparison with object-structure size, and in most implementations an execution environment contains many fields (and is many times the size of, for instance, the typical object structure). But FIG. 7A specifically depicts only the fields germane to the subject of FIGS. 7A–K.

A given execution environment's next-free field contains a pointer to a linked list of what we call "lock records" allocated to that execution environment. In the illustrated embodiment, a thread's initialization includes allocation of a pool of lock-record structures, such as lock record 50, that can be used for synchronization in a manner to be described below. Each lock record contains an owner field that identifies the thread to which it is allocated. Specifically, the owner field contains a pointer to that thread's execution environment. Execution environment 44's free-lock-records field contains a pointer to lock record 50, which is the first lock record in a linked list of lock records available for use by thread T1, and lock record 50's next-free field contains a pointer to the next lock record in that linked list. Lock records 52 and 54 are the lock records in the linked lists of available lock records allocated to threads T2 and T3, respectively.

When a thread obtains a lock on an object, it identifies itself as the holder of the lock by selecting a lock record from its pool and placing a pointer to that lock record in the object's header. Since this places that lock record in use, the thread removes that lock record from its linked list of available lock records: the thread replaces the contents of its execution environment's free-lock-records field with the contents of that lock record's next-free field. As will also be described below, though, subsequent synchronization operations by other threads may place those threads' lock records in a different linked list, one whose members belong to threads waiting in one way or another for access to the object, and the lock record additionally includes a next-LR field to support that linked list. When the lock record is initially allocated, this field contains a NULL value.

Figure 7B:
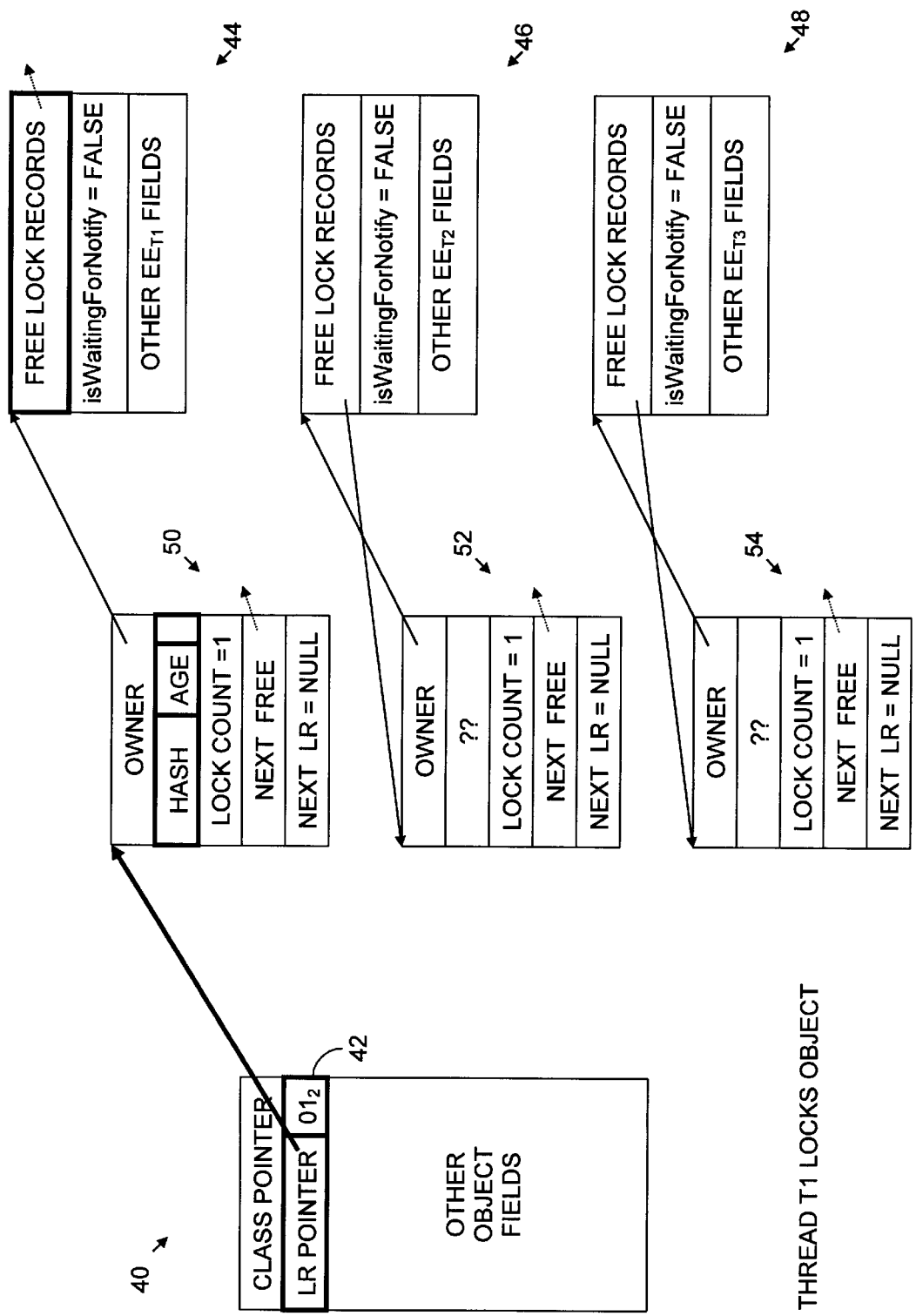

FIG. 7A represents the situation in which no synchronization activity is occurring. If in that situation thread T1 encounters code that calls a synchronized method on the object, thread T1 will need to acquire a lock on that object. FIG. 7B shows the result of thread T1's acquisition of that lock. As FIG. 7B shows, the illustrated embodiment's locking operation removes the hash- and age-field contents from the object structure 40's header. So as not to lose these values, the thread reads them before that removal. In the illustrated embodiment, it does so as part of what we call "meta-lock" acquisition, which in accordance with the present invention precedes at least some types of monitor-access operations, such as object locking. As will be described below in connection with FIGS. 8 and 9A–J, the central purpose of meta-lock acquisition is to accord the thread exclusive access to resources, such as lock records, that support the monitor-access operation.

After reading the hash and age values as part of meta-lock acquisition, the thread stores them in a field provided for that purpose in the next available lock record. With the hash and age values thus stored, the thread can use the header's identifier field, which previously held them, to hold the pointer to the lock record 50. Actually, the identifier field consists of only thirty bits in total, so it can hold only the most-significant thirty bits of the (in this embodiment, thirty-two-bit) lock-record pointer. But this is adequate, because the illustrated embodiment's lock-record locations are known to be four-byte aligned; the last two bits of any are known always to have the value $00_2$, so the complete address of a lock record can be inferred from a truncated pointer containing only its most-significant thirty bits. Thread T1 employs a meta-lock-release operation, to be described below in connection with FIGS. 9A–J and 10, to place this truncated pointer in the header's identifier field and place the value $01_2$ in the object's synchronization-state field 42, as FIG. 7B also indicates. That value signifies that the object is locked.

Although different threads cannot have locks on the same object simultaneously, the Java virtual machine allows a single thread to have more than one lock on an object. To keep track of the number of locks, the lock record includes a lock-count field. To save steps, the value that a typical implementation places in that field when the lock record as initially allocated is one, even though no lock has yet been acquired, since the lock-count field should have that value when the lock record is initially brought into use.

The meta-lock-acquisition operation actually results in an additional header state between those that FIGS. 7A and B depict. Such a state also occurs between the states that each other pair of consecutive FIG. 7 drawings represents, but we postpone a description of that state until we discuss meta-locking below in connection with FIGS. 9A–J. Also, the header state that results from the meta-lock-release operation would differ from that shown in FIG. 7B if another thread had attempted to begin a monitor-access operation while thread T1's was still in progress. Throughout the discussion of FIGS. 7A–K, though, we will assume that each thread completes its monitor-access operation before the next thread's monitor-access operation begins. The way in which the meta-lock-acquisition and -release operations are performed when this assumption is violated will thereafter be described by reference to FIGS. 8, 9A–J, and 10.

The usual reason for a thread to lock an object is to read or write one or more of that object's fields. Let us suppose that a result of thread T1's reading one of the object fields is its synchronized method's discovery that the object is not yet in a state required for subsequent method steps. In such a situation, a method may call for its current thread to "go to sleep," i.e., to have the operating system suspend the thread and not re-activate it until some condition changes. To do so, the thread calls the object's wait( ) method, which begins with a monitor-access operation.

Figure 7C:
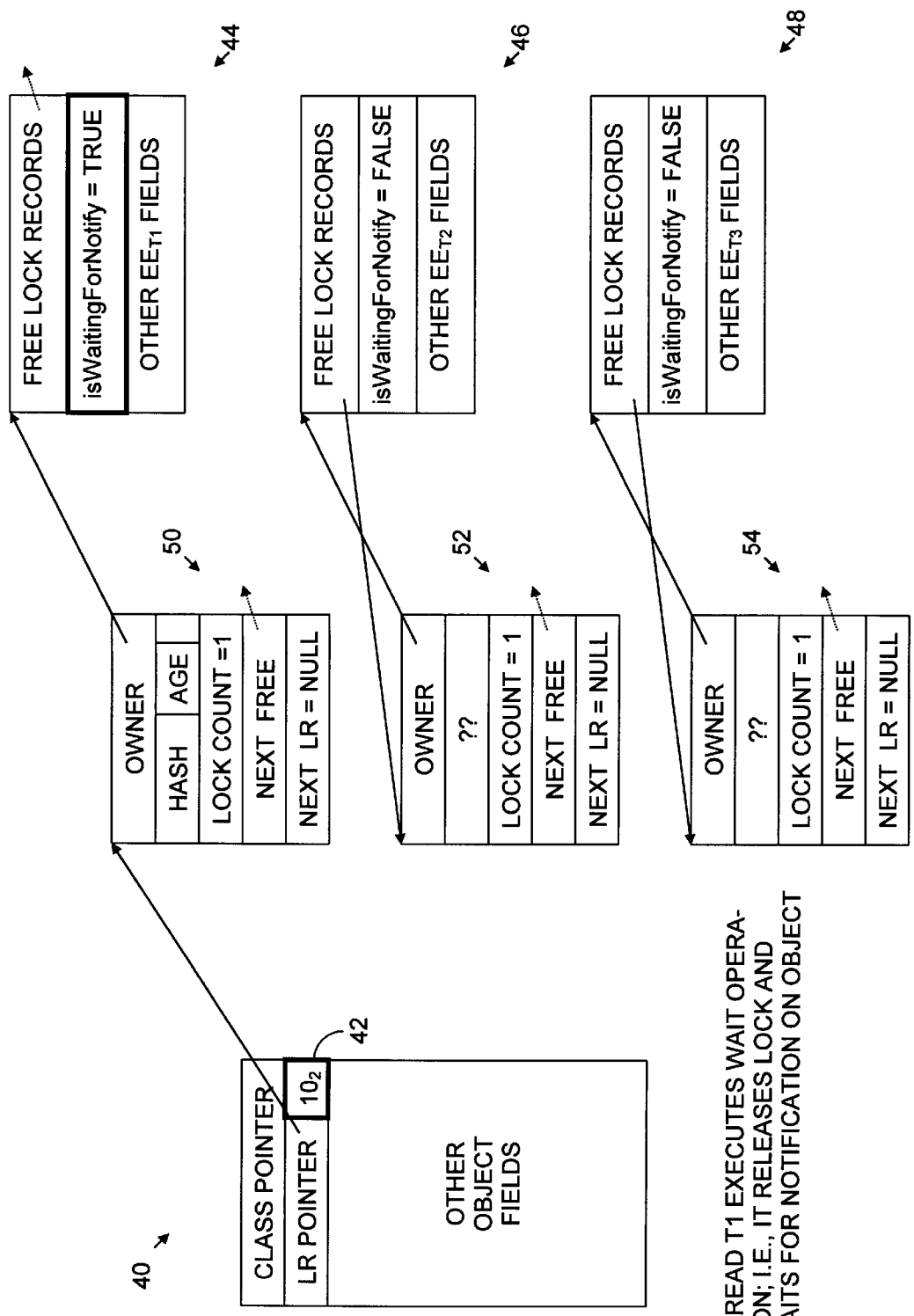

FIG. 7C depicts the result of that monitor-access operation. Specifically, thread T1 changes the code in the synchronization field 42 to $10_2$. This code indicates that the object is not locked but that there is a thread that is waiting for a lock or, as is the case here, is waiting to be "notified" about something related to the object. The thread sets its isWaitingForNotify field to its TRUE value to indicate that it is waiting for notification as opposed to a lock. As in the previous monitor-access operation and the other monitor-access operations that FIGS. 7A–K illustrate, access to the monitor resources is guarded by the meta-locking to be described in connection with FIGS. 8, 9A–J, and 10.

Figure 7D:
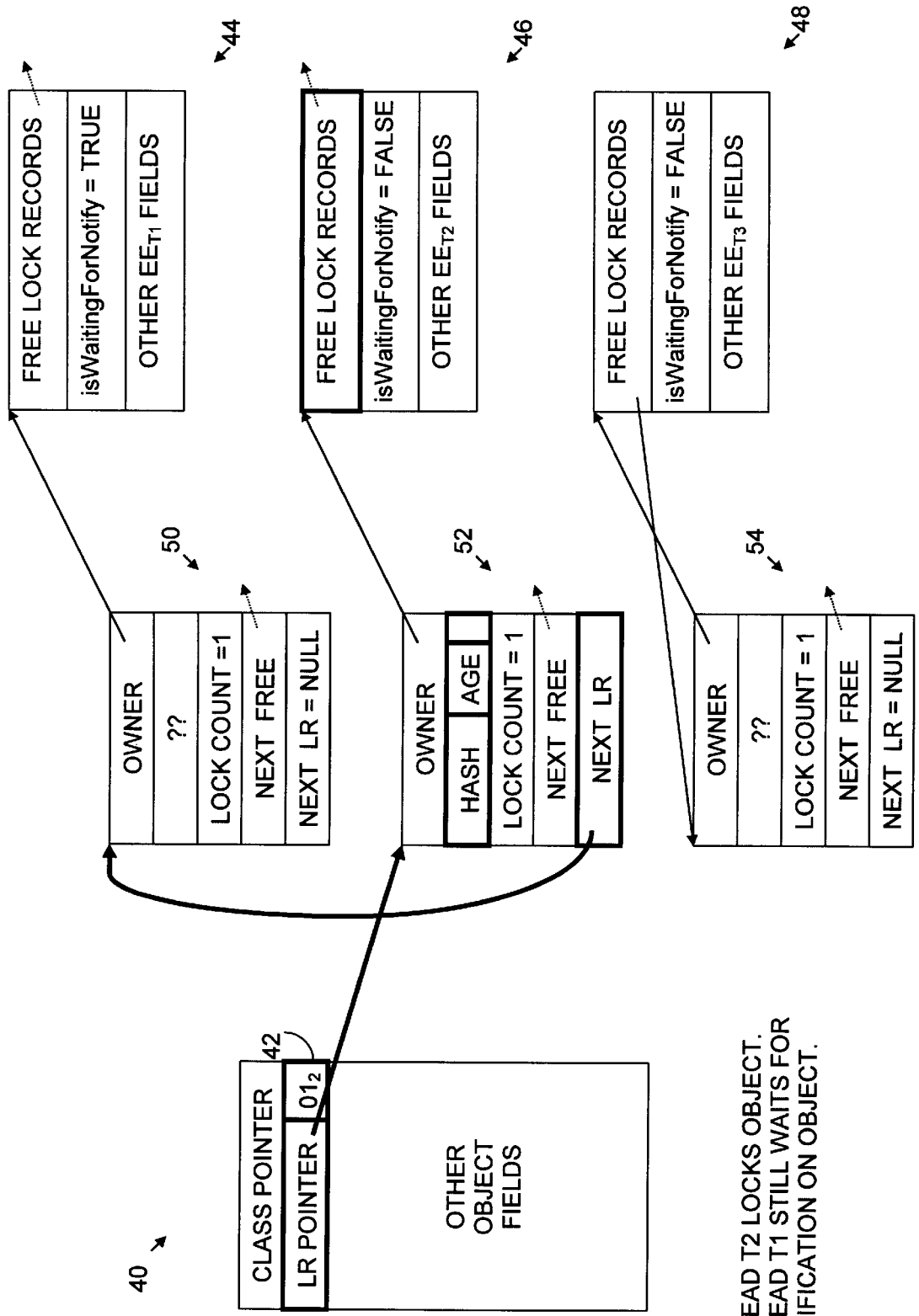

Any thread that obtains a lock places a lock record from its pool at the head of the locked object's linked lock-record list. FIG. 7D illustrates this by showing the result of thread T2's obtaining a lock on the object while thread T1 is waiting for notification. Note that thread T2's locking at this point does not violate the FIG. 7 assumption that each monitor-access operation is completed before the next one starts. Thread T1's wait operation includes more than one monitor-access operation. The first of these, which was to place the thread in the queue of threads waiting for notification, is completed when thread T2 begins to obtain the lock, even though thread T1's wait for notification is not.

As FIG. 7D shows, one result of thread T2's locking operation is that thread T2 has taken a lock record 52 from its linked list of available lock records. It has also placed that lock record at the head of the object's linked list by pointing the object header's lock-record pointer to lock record 52 and placing a pointer to lock record 50 in lock record 52's next-LR field. Another result of the locking operation is that the hash and age values that lock record 50 previously contained have been copied into corresponding fields of thread T2's lock record 52. Additionally, thread T2 has changed the synchronization-state field 42's contents to the lock-indicating value, $01_2$.

Note that FIG. 7D's representation of thread T1's lock record 50 contains question marks in the location that previously contained the hash and age fields. In practice, the hash and age values typically still would be in that location. But the hash and age values are updated as necessary only in the object header or the first lock record, not in any other lock record, so the question marks represent the resultant, possibly stale values.

Although FIG. 7D depicts lock record 52 as having a lock count of one, it is possible that the synchronized method responsible for the lock is of the recursive variety: it may call itself. In such a situation, each nested call of that routine could obtain a further lock, and the result would be to increment the lock count. When the nested subroutines subsequently start returning, each would release a lock by, among other things, decrementing the lock count. Actually, such multiple locking can result not only from recursive synchronized methods but also from any synchronized method that calls another synchronized method on the same object.

Figure 7E:
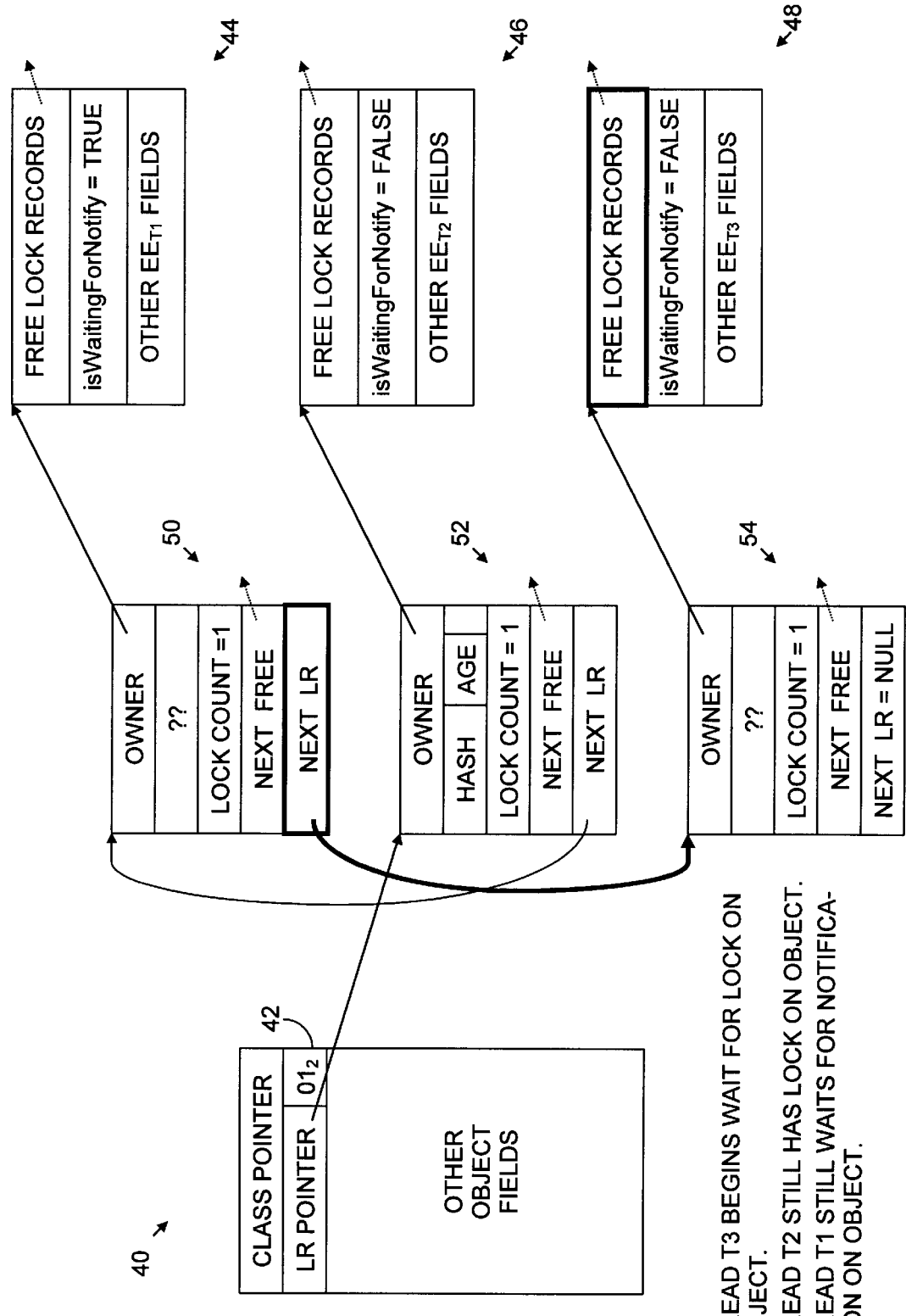

FIG. 7E illustrates the result of an attempt by a further thread, T3, to obtain a lock on the object. As FIG. 7D shows, thread T2 already has a lock on the object, so thread T3 takes a lock record 54 from its free-lock-record list and places it at the end of the object's linked list, not at the beginning. That is, since synchronization-state field 42's value is $01_2$, meaning that the object is already locked, thread T3 follows that object's lock-record list to lock record 50, whose NULL next-LR value distinguishes it as the last lock record in the list. It makes that next-LR field point to a lock record chosen from thread T3's pool of available lock records. Since there can be at most one lock-owning thread for a given object, and since that thread's lock record is at the head of the object's linked lock-record list, both of the other lock records represent threads that are waiting for the object. Since the isWaitingForNotify field of the execution environment to which lock record 50 points has a TRUE value, whereas that of the execution environment to which lock record 54 points has a FALSE value, FIG. 7E depicts a state in which lock record 50 represents a thread waiting for notification, while lock record 54 represents a thread waiting to obtain a lock.

Figure 7F:
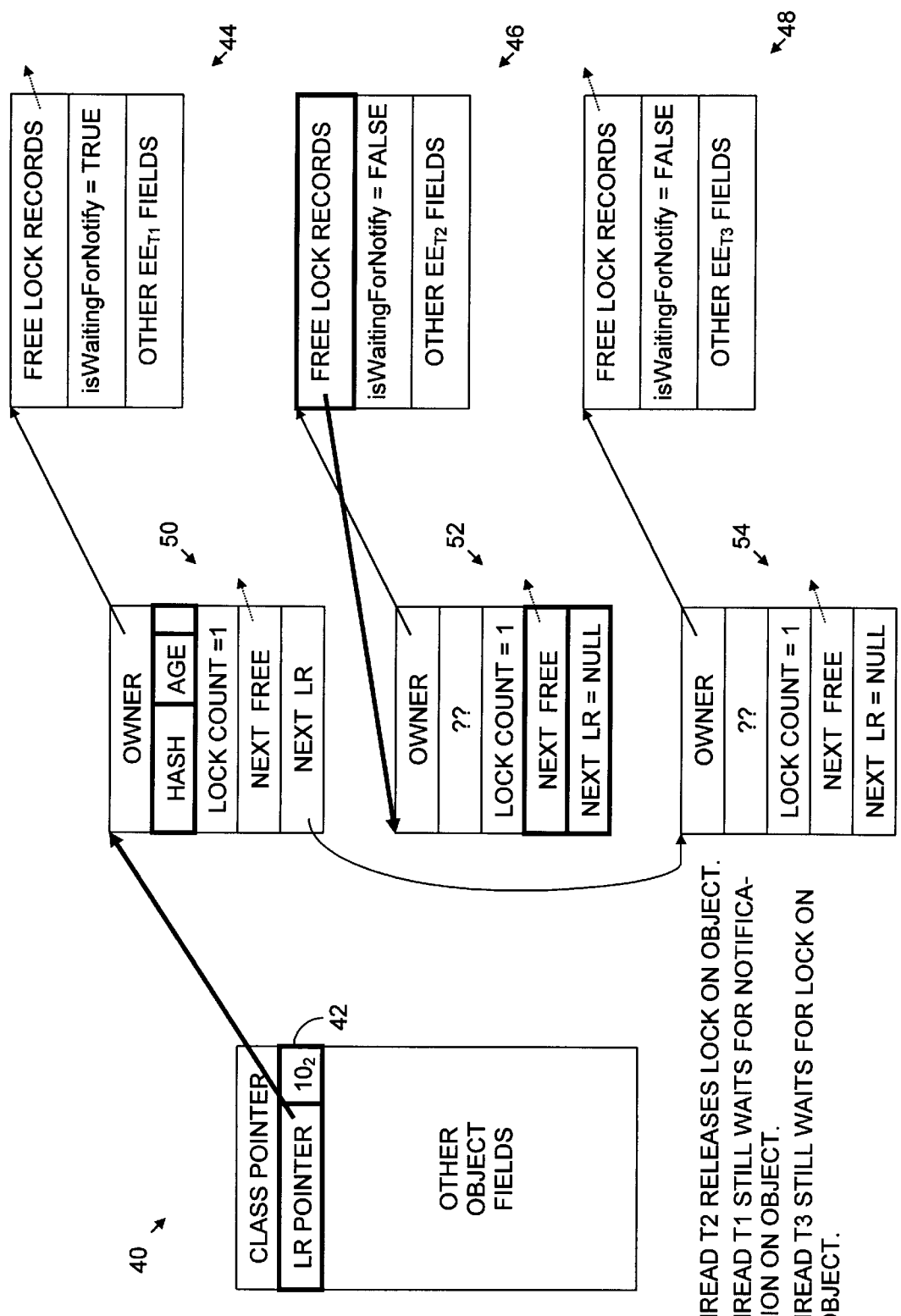

When thread T2 completes the synchronized method or other synchronized code block, it releases the lock by placing the most-significant thirty bits of its next-LR field's value in the object's identifier field, setting that field's synchronization-state field to $10_2$, resetting its next-LR field to the NULL value, and copying its lock record 52's hash and age fields into the corresponding fields of the next lock record, lock record 50. It also returns its lock record 52 to the start of its free-lock-record list. FIG. 7F depicts the result.

Note that all of the lock records in FIG. 7F contain lock counts of one, even though none represents a lock on the object. The lock count does not matter for any of those records; that count's value has meaning only in a lock record that represents an existing lock, i.e., only in the first lock record in a linked list pointed to by an object whose synchronization-state field has the value $01_2$. Leaving a value of one in that field saves a step if the lock record is subsequently used to represent a lock.

Figure 7G:
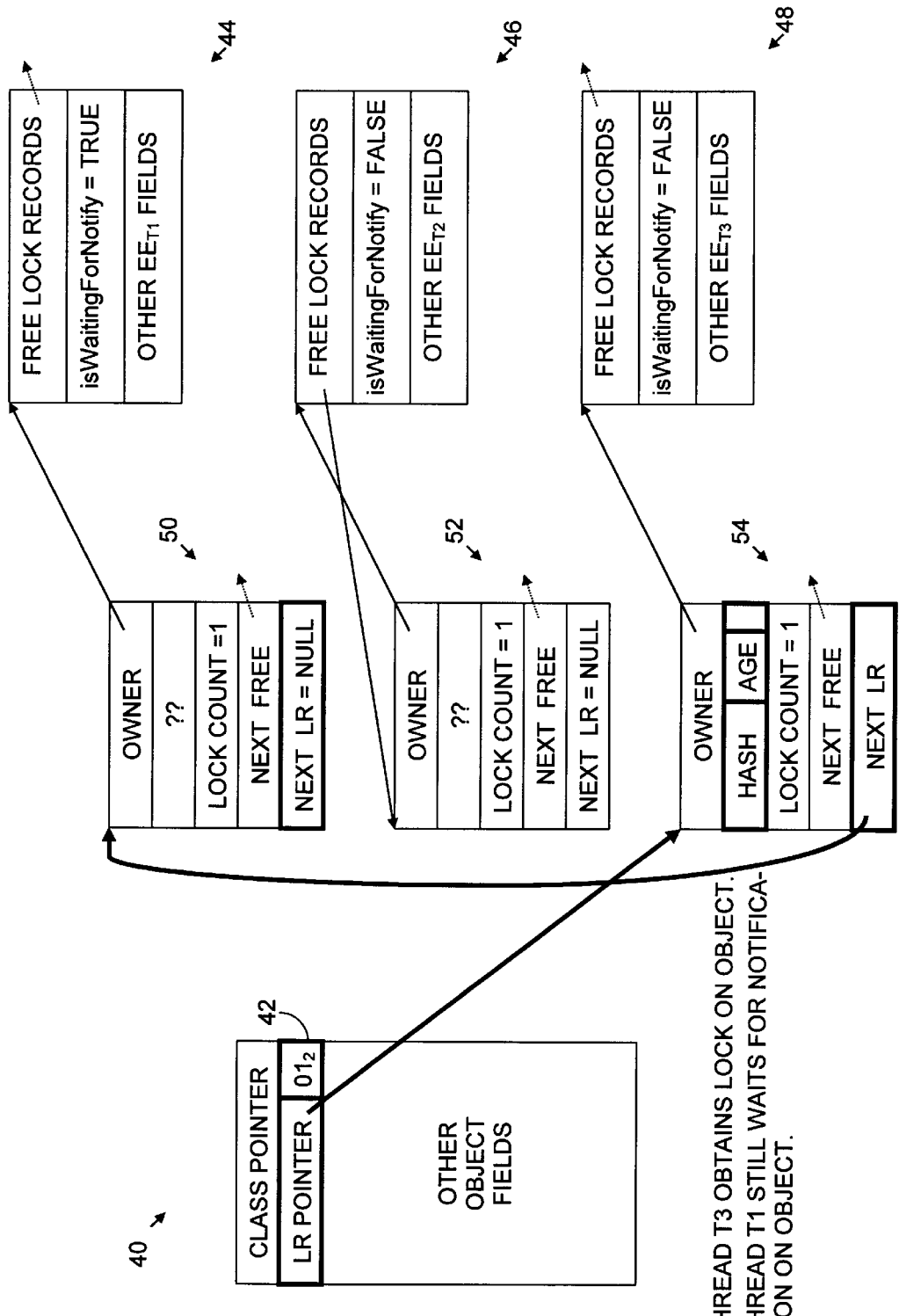

Part of thread T2's lock-release operation not mentioned above is a system call that results in the operating-system thread scheduler's reactivating at least one thread, such as thread T3, that is waiting to obtain a lock on the object. (Thread T1 is waiting for notification rather than a lock.) When thread T3 is reactivated, the object is no longer locked, so thread T3 thread can obtain a lock on it. To that end, thread T3 places its lock record 54 at the head of the list, as FIG. 7G illustrates. That is, it replaces the contents of the object's lock-record pointer with the first thirty bits of a pointer to its lock record 54, places in that lock record's next-LR field a pointer to the erstwhile first lock record 50, and resets that lock-record's next-LR field to a NULL value. It also changes the contents of the object's synchronization-state field 42 from $10_2$ (meaning not locked but having a queue of least one waiter) to $01_2$ (meaning locked).

At this point in the example, we assume that, having obtained a lock on the object, thread T3 performs a further monitor-access operation, namely, "notifying on" the object. In the Java programming language, three native methods of the class Object are wait( ), notify( ), and notifyAll( ), which the Java virtual machine usually implements by mapping to the underlying operating system's thread-suspension and -resumption operations. The wait( ) method, which thread T1 performed a monitor-access operation to begin in FIG. 7C, directed the operating system to take that thread out of the queue of activated threads until such time as another thread, in performing the object's notify( ) method, chooses to deliver the notification to thread T1.

Figure 7H:
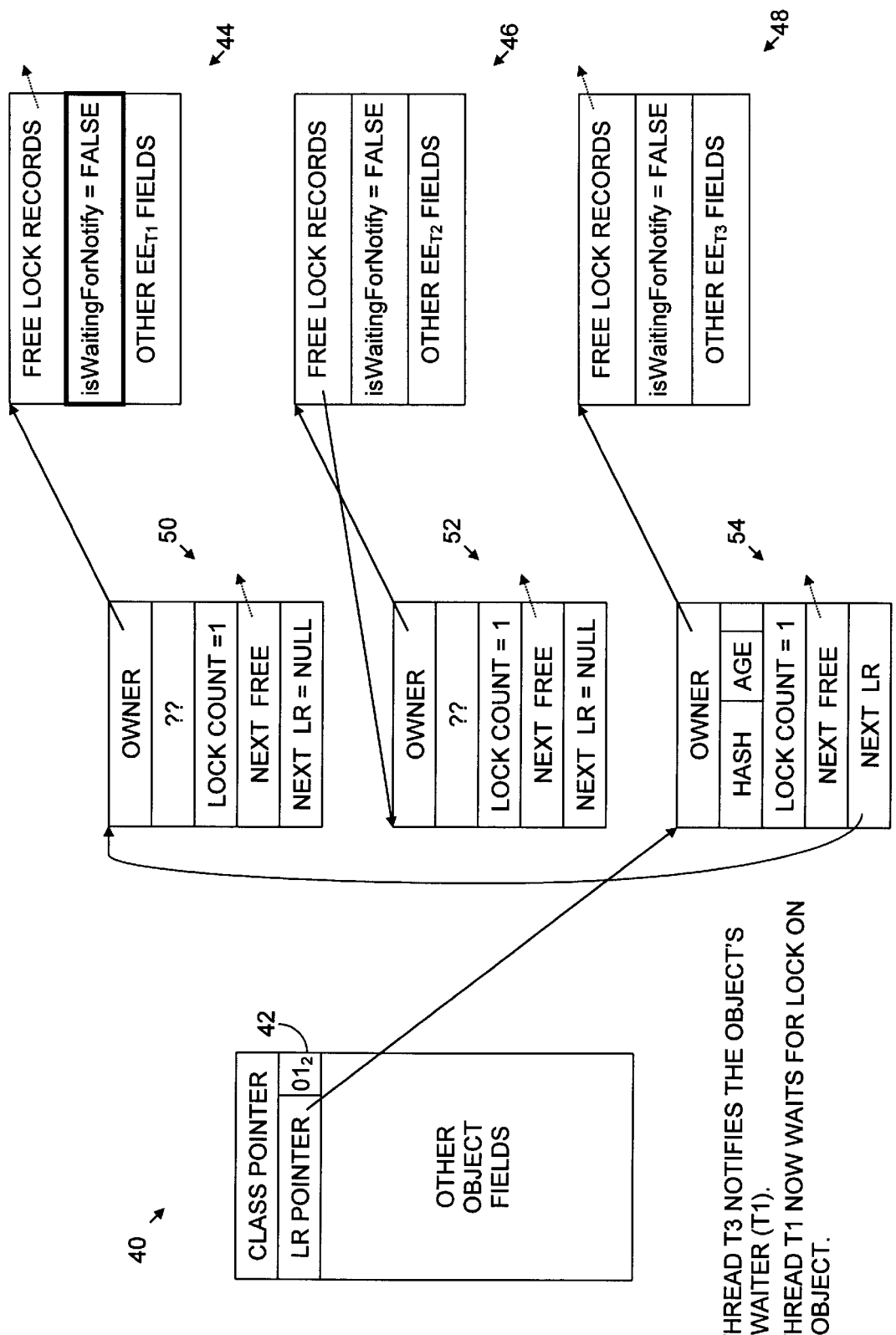

FIG. 7H shows what happens when thread T3 then performs the notify( ) method on the object. Specifically, it follows the linked lock-record list to find the first lock record whose owner is a thread waiting for notification. In this case, that lock record is thread T1's lock record 50. Guided by that lock record's owner pointer, it sets thread T1's isWaitingForNotify value to FALSE, thereby converting thread T1 to a waiter for a lock rather than for a notification.

The notifyAll( ) operation is the same as the notify( ) operation, with the exception that the notifying thread notifies each thread awaiting notification, not just the first one.

Figure 7I:
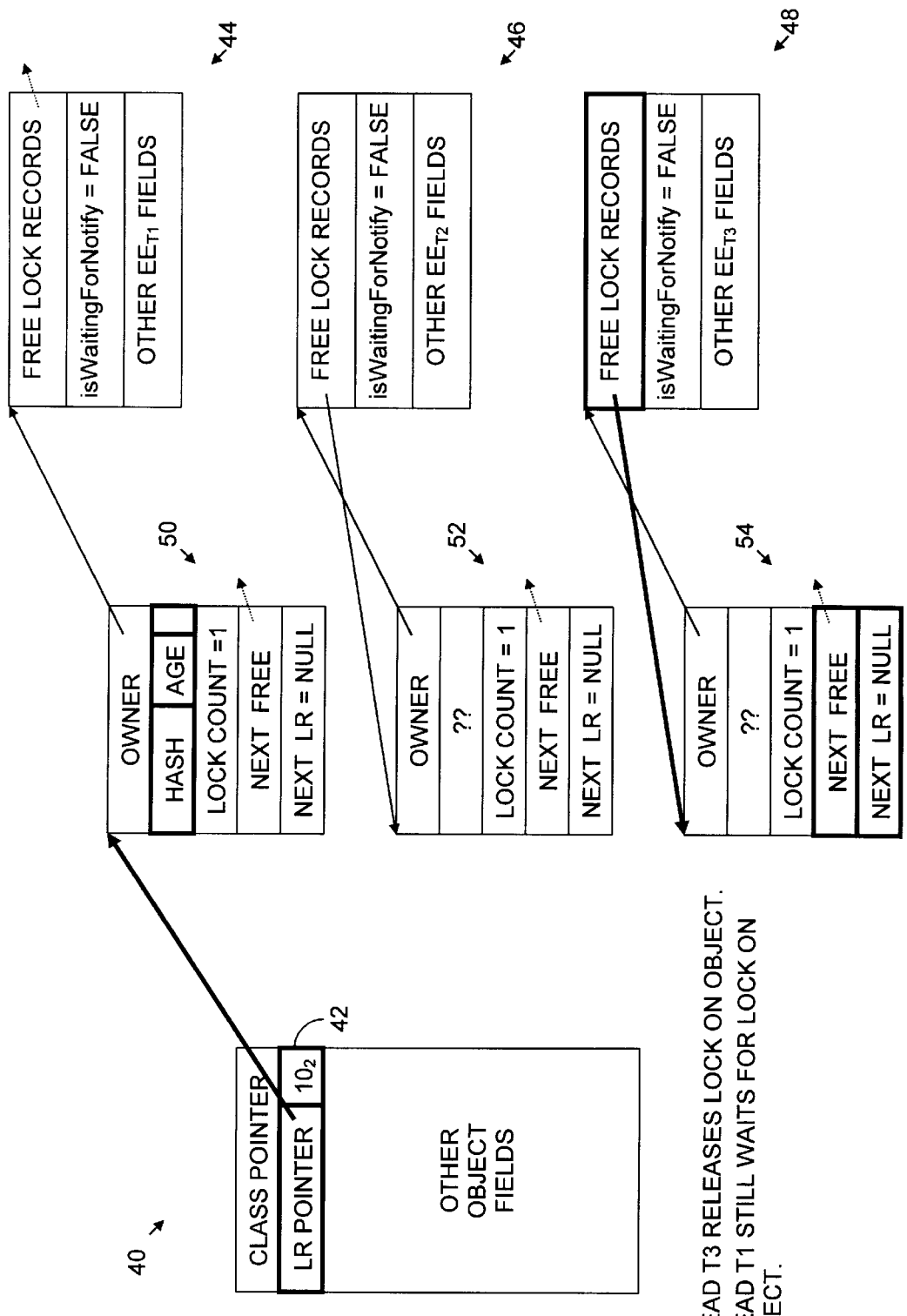

Thread T3 then releases its lock on the object, as FIG. 7I illustrates. Specifically, it changes the object's synchronization-state field 42 to $10_2$ to indicate that the record is not locked but does have a queue of at least one waiter associated with it. It then removes its lock record from the linked lock-record list by changing the contents of that lock record's next-LR field to NULL and redirecting the object's lock-record pointer to thread T1's lock record 50, i.e., placing in that pointer field the first thirty bits of the value from the next-LR field of thread T3's lock record 54 so that it points to the new head of the linked lock-record list. This leaves lock record 54 free for reuse, so thread T3 returns that record to thread T3's queue of free lock records by placing the pointer from its execution environment's free-lock-records field in that of lock record 54 and replacing it with a pointer to lock record 54. It completes the operation by copying the hash and age fields from lock record 54 into the new first lock record 50.

Figure 7J:
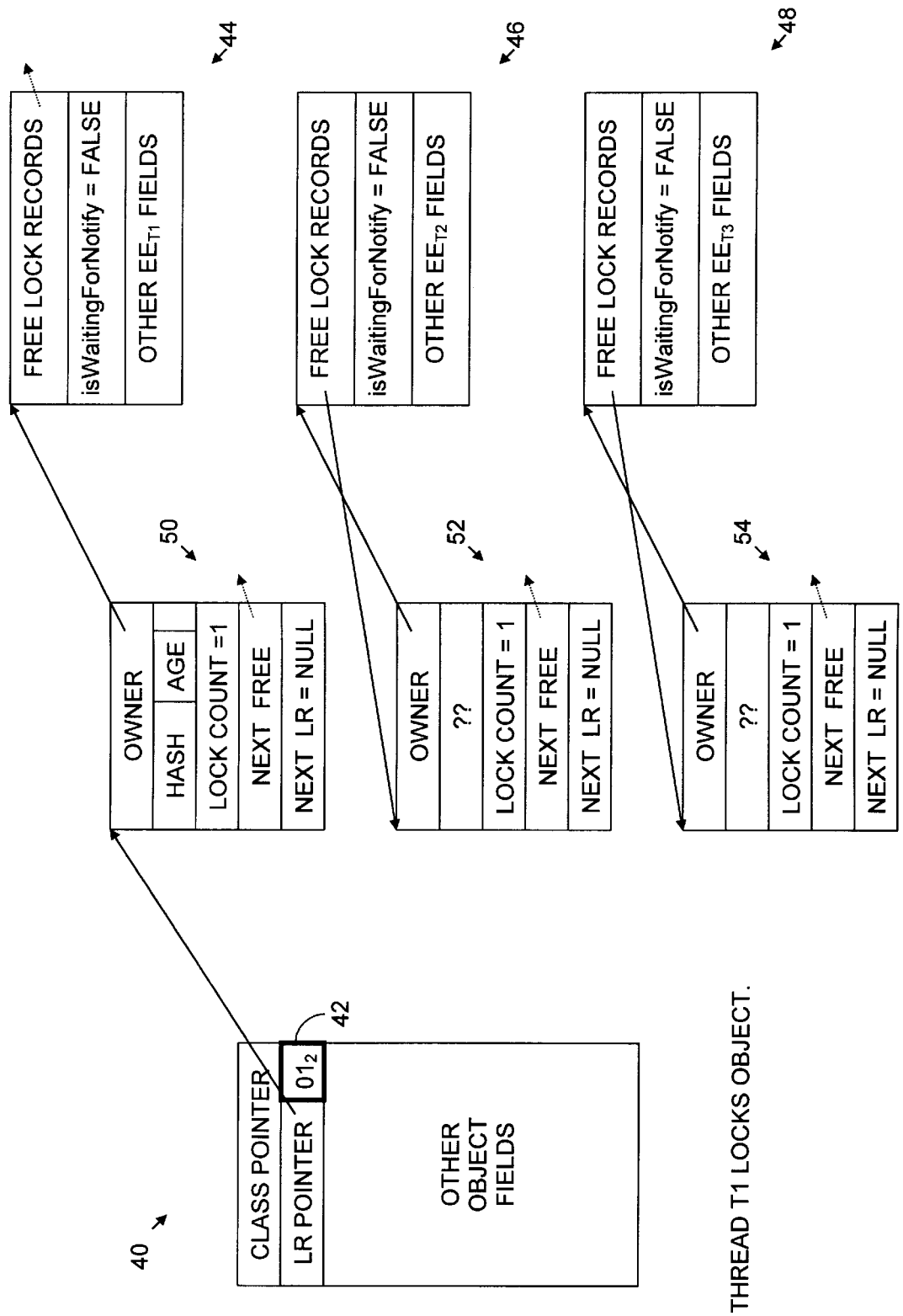

As was mentioned above, the lock-release operation makes system calls to reactivate one or more waiting threads not waiting for notification. Since thread T1's isWaitingForNotify value is no longer TRUE, this may include thread T1, in which case the operating system gives it a turn to execute. When it does, it obtains a lock on the object, placing the lock-indicating code $01_2$ into the object's synchronization-state field 42, as FIG. 7J illustrates.

Figure 7K:
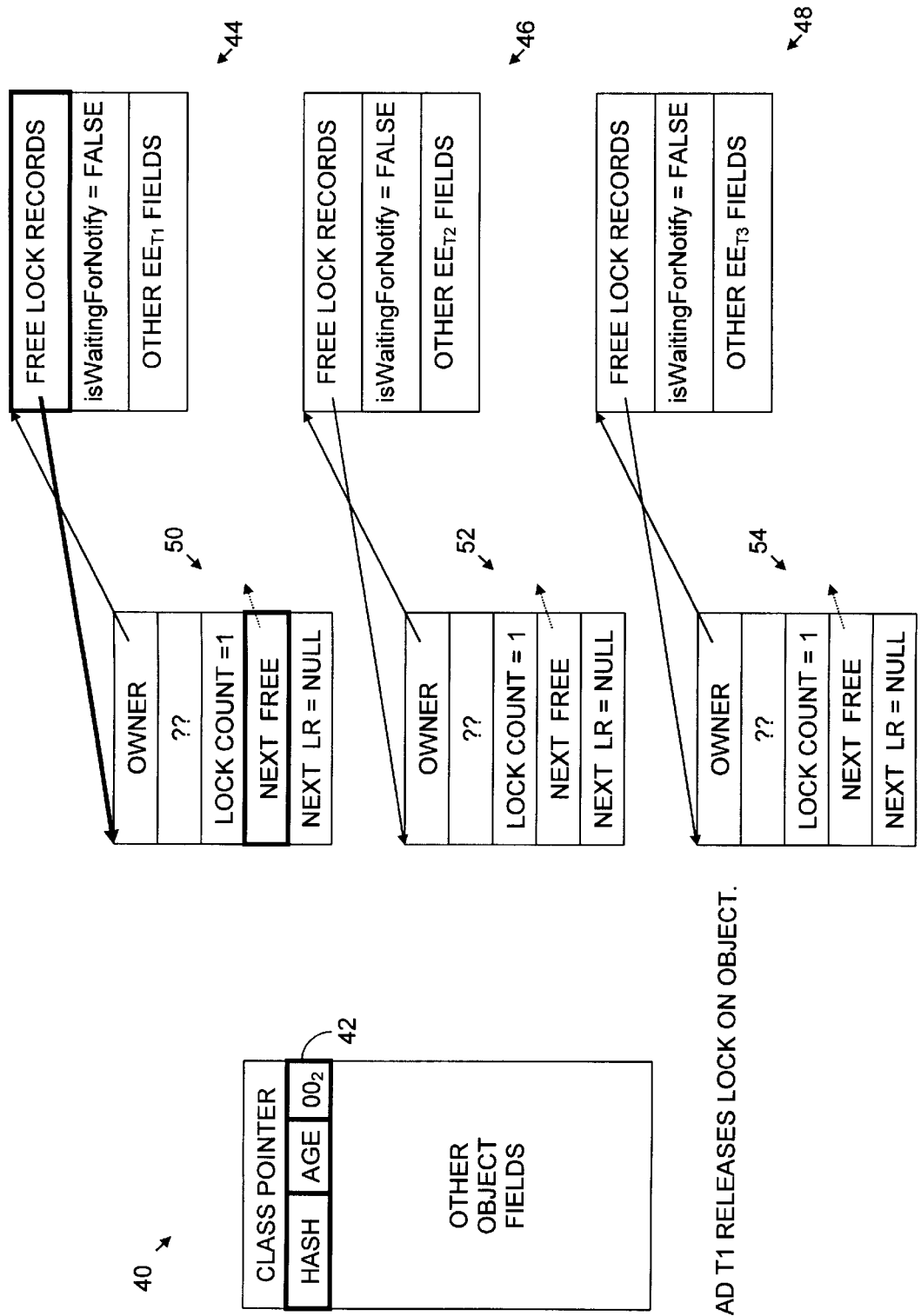

When thread T1 has completed the operations for which it required the lock, it releases the lock, as FIG. 7K illustrates, by returning the hash and age values to the object header's appropriate fields and setting the object's synchronization-state code to $00_2$, which indicates that there are no locks or waiters. In FIG. 7K, lock records 50, 52, and 54 are shown in the states that prevail when they have been returned to their respective threads' pools of available lock records. Note that the only per-object resource required to support thread safety is the two-bit synchronization-state field 42. Although multiple lock records were additionally needed to support the object's synchronization operations, these are not per-object resources: they belong to associated threads, and they are bound only to objects on which their threads are currently synchronized. So the number of required lock records is ordinarily negligible in comparison with the number of structures required for per-object resources.

Having reviewed the way in which exemplary monitor-access operations may be performed in the absence of contention for monitor resources, we turn to a discussion of how they acquire and release meta-locks to deal with such contention. FIG. 8 is a simplified C-language listing of a routine, getMetaLock( ), for performing meta-lock acquisition. It was mentioned in connection with the examples of FIGS. 7A–K that the monitor-access operations depicted in those drawings begin by using the meta-lock-acquisition operation to read the object header's lock word. In the cases that those drawings illustrate, in which there has been no contention for monitor resources—i.e., in which the previous monitor-access operation was completed before the current one started—that lock word is the bit field shown by FIG. 8's first line to be getMetaLock( )'s return value. The discussion that follows will additionally explain that, when there is contention, getMetaLock( ) instead returns the value that the lock word would have had if the previous monitor-access operation had been completed before the current one started.

We assume for the sake of illustration that getMetaLock( ) is called in the state that FIG. 7B represents, i.e., in a state in which the lock word's first thirty bits are the first thirty bits of the lock-record pointer. As FIG. 8's first line shows, the arguments that the calling monitor-access operation passes to getMetaLock( ) are pointers to the executing thread's execution environment and to the object on which the thread is attempting to obtain a lock. The heart of the getMetaLock( ) routine in the illustrated embodiment is its third-line step of the placing the value $11_2$ (referred to in the listing as "IsBusy") in the object header's synchronization-state field, whose contents in the absence of meta-locking are $00_2$ (no locks or waiters), $01_2$, (locked), or $10_2$ (waiters only). That value's meaning is that a thread has a meta-lock on the object, i.e., has a lock on its monitor resources. The same step replaces the identifier field's contents with the first thirty bits of a pointer to the thread's execution environment. (Execution environments, too, are four-byte aligned in the illustrated embodiment, so an execution-environment pointer's value can be inferred from its thirty most-significant bits.)

This third-line replacement is part of a swap operation performed by making a call that takes advantage of the fact that reading the lock-word field's contents and replacing them can be performed atomically, i.e., can be guaranteed to occur without any intervening operation. In some cases this atomicity is inherent because the instruction set of the processor involved includes an atomic "swap" operation. In others, it results from the swap's being implemented as a call to a system-API routine that the operating system does not permit its thread-scheduling operation to interrupt. The resultant atomicity avoids the need for any lower-level lock on the object header.

If that operation is begun in the state that FIG. 7B represents, it results in the transition between the states that FIGS. 9A and B depict. In all FIG. 9 drawings, the object's structure is on the left, while various fields of thread T1's, T2's, and T3's execution environments are on the right. (Although the drawings depict each execution environment as a single group of contiguous memory locations, and although such an arrangement is beneficial, those skilled in the art will recognize that there is nothing critical about such an organization, and execution-environment fields can in fact be disbursed to suit the particular application.)

As FIG. 8's fourth line indicates, getMetaLock( ) returns the value of the thus-read lock word so long as the value of its synchronization-state field is not IsBusy ($=11_2$), i.e., so long as the calling monitor-access operation does not begin until all previous monitor-access operations have released the meta-lock. This is the situation assumed above in connection with FIGS. 7B and C.

But now suppose that, instead of waiting for thread T1 to complete the wait-operation commencement that produced the FIG. 7C state, thread T2 attempts to begin the subsequent lock operation before the FIG. 7C state is reached, i.e., while the object's header is still in the meta-locked state that FIG. 9B depicts. Thread T2's attempt to perform a monitor-access operation still begins with the atomic swap operation of FIG. 8's third line, so it replaces the first thirty bits of thread T1's execution-environment pointer with the corresponding bits of its own execution-environment pointer. But this time the condition in FIG. 8's fourth row is false: as FIG. 9B indicates, the value in the object's synchronization-state field 42 is $11_2$. So, instead of returning the contents of the object's lock word, getMetaLock( ) returns the return value of another routine. This routine, called getMetalLockSlow because a slow metal-lock operation thereby results, returns the value that the object header's lock word would have had if the previous monitor-access operation had first gone to completion, as it did in FIG. 7C.

Basically, getMetaLockSlow( ) determines that value by waiting until the previous monitor-access operation has completed. According to the invention, though, the predecessor thread does not then write that value back into the object's lock word, as it would in the absence of contention for the synchronization resources; to do so would erase the object structure's meta-lock indication, which tells other threads that the necessary synchronization resources are still reserved, as, upon thread T1's release, they are by thread T2. Instead, the meta-lock-releasing thread passes that value to its successor through fields in their respective execution environments.

Figures 9C, 9D:
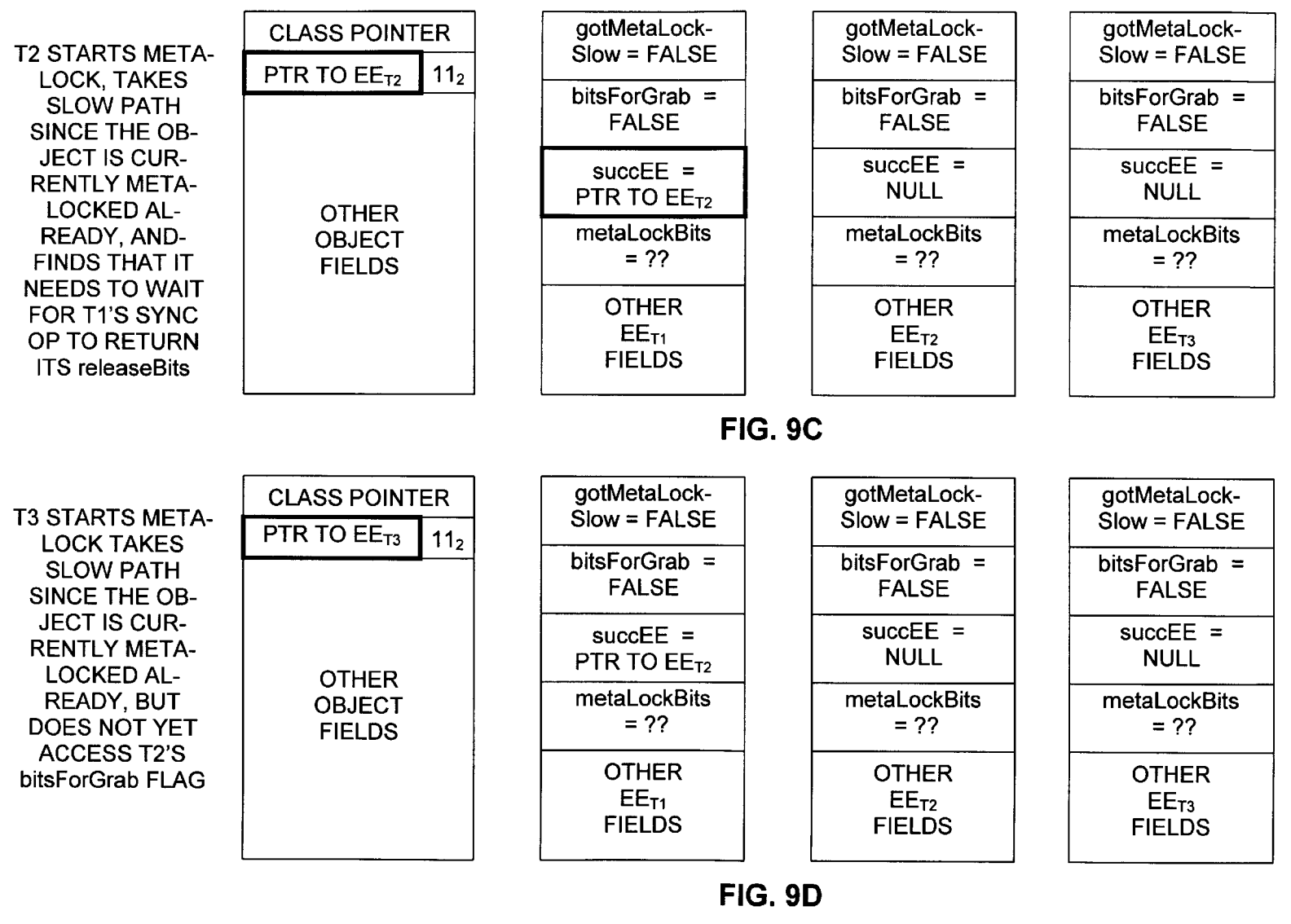

For communication to occur in that fashion, thread T1 will ordinarily need to know which thread is its successor, and FIG. 9C illustrates the result of thread T2's giving thread T1 this information by writing thread T2's execution-environment pointer into an appropriate field of thread T1's execution environment. FIG. 8's twentieth line represents that step. To do this without risking the inconsistencies in which concurrent access to thread T1's execution environment could otherwise result, thread T2 executes the tenth-line system call to obtain a lock on a mutex that the threads associate with T1's execution environment. If some other thread currently has a lock on that mutex, mutexLock( ) suspends the calling thread until the lock is released.

As FIG. 8's eleventh and eighteenth lines indicate, the successor-thread-identification operation represented by its twentieth line occurs only if the contents of a bitsForGrab field in the predecessor's execution environment has a FALSE value. The reason for this condition will be explained presently, but it usually prevails, so that identification operation usually occurs. Having thus identified itself to its predecessor thread T1, thread T2 then waits for thread T1 to complete its monitor-access operation and communicate the resultant release bits—i.e., the lock-word value that thread T1 would place in the header if there were no synchronization-resource contention—to thread T2.

To this end, thread T2 makes the system call of FIG. 8's twenty-third line. This system call (1) directs the operating system to suspend the calling thread until some other thread "signals" a condition variable to which the predecessor's execution environment points in a field not shown, (2) releases the lock on the mutex associated with access to the predecessor's execution environment, and (3) attempts to reacquire the lock on that mutex when it is awakened. The reason for placing this step in a do-while loop will be set forth presently.

We now assume that yet another thread, thread T3, attempts to begin a monitor-access operation before the previous meta-lock on the monitor resources has been released. Thread T3 begins just as thread T2 did. But we will assume for the sake of illustration that the operating system's thread scheduler ends thread T3's time slice during execution of the instructions that result from, say, FIG. 8's tenth line. Accordingly, FIG. 9D shows the object's lock word as containing the first thirty bits of a pointer to thread T3's execution environment as a result of this step in FIG. 8's line 3, but thread T3 has temporarily been interrupted before it can identify itself to its predecessor by placing a pointer to its execution environment in the succEE field of thread T2's execution environment.

When thread T1 completes the monitor-access operation for which it acquired a meta-lock in FIG. 9B, it must release its meta-lock. To this end, it performs a releaseMetaLock( ) routine, which FIG. 10 represents by simplified C code. As that drawing's first line indicates, a monitor-access operation that is releasing a meta-lock passes the releaseMetaLock( ) routine not only pointers to its thread's execution environment and the object but also releaseBits, which is the data word that will be written into the object's lock word if no other thread is contending for the synchronization resources.

In the absence of such contention, that writing occurs in the third and fourth lines' step. That step involves a processor- or operating-system-provided atomic operation known as "compare-and-swap." This operation is similar to the swap operation described above in that it reads the lock word's contents, but it differs from that operation in that replacement of those contents is conditional upon their having a predetermined value. Specifically, the thread performing FIG. 10's releaseMetaLock( ) operation replaces the object's lock word with the releaseBits value passed to it by the calling monitor-access operation only if that lock word still contains the data word that the thread wrote there when it obtained the meta-lock, i.e., only if no successor has attempted to begin a monitor-access operation in the interim. If none has, then the meta-lock-release operation is completed.

In the present example, though, threads T2 and T3 have both attempted to begin monitor-access operations and thus modified the object's lock word since thread T1 obtained the meta-lock. In particular, the header's lock word is now in use to identify the last meta-lock contender. To avoid erasing this information, the compare-and-swap operation fails, so the releaseBits value is not thereby communicated to thread T2 through the object's header. Instead, releaseMetaLock( ) calls releaseMetaLockSlow( ), as FIG. 10's fifth line indicates, to perform that communication through the execution environments.

In executing releaseMetaLockSlow( ), thread T1 acquires the mutex that locks its execution environment, as FIG. 10's eighth line indicates. It then determines whether its execution enviromnent's succEE has a non-NULL value, i.e., whether thread T1's successor has already identified itself. As was explained by reference to FIG. 9C, its successor thread T2 has in fact done so by placing in that field a pointer to thread T2's execution environment. The releaseMetaLockSlow( ) routine therefore executes its branch that includes the fourteenth-line step of communicating the releaseBits value to thread T2 by placing that value in the metaLockBits field of thread T2's execution environment, as FIG. 9E indicates. As that drawing also indicates, thread T1 additionally performs the sixteenth-line step of setting to the TRUE value a gotMetaLockSlow flag, which indicates whether the metaLockBits field of thread T2's execution environment has received the releaseBits result of the monitor-access operation that thread T2's predecessor performed.

Having already used the successor-identity information in its succEE field, thread T1 then performs the seventeenth-line step of setting that field to a NULL value, as FIG. 9E also indicates. It then performs the eighteenth-line step of unlocking the mutex that guards access to its execution environment, after which it "signals" the condition variable that tells the operating system to awaken at least one other thread waiting to acquire that mutex. In other words, it may signal the operating system to cause thread T2's execution to resume.

This completes T1's release of its meta-lock. Note that the resultant object-header state depicted in FIG. 9E differs from the result, depicted in FIG. 7C, that the same monitor-access operation produced when there was no contention for the synchronization resources. Specifically, FIG. 9E does not show the object's header as containing the waiter-list synchronization-state value and a pointer to a lock record. That information, which thread T2 needs in order to perform its monitor-access operation, has instead been placed in the metaLockBits field of thread T2's execution environment.

Thread T2 resumes its meta-lock-acquisition operation now that thread T1 has caused it to be awakened. Specifically, it continues with the do-while loop of FIG. 8's twenty-second through twenty-fourth lines, at which its operation was suspended in accordance with the condvarWait( ) system call. It will ordinarily have been awakened at this point only after its predecessor has transferred releaseBits to it and thereupon set thread T2's got- MetaLockSlow value to TRUE. If that value is not TRUE, Thread T2 suspends itself by again calling condvarWait( ).

Otherwise, thread T2 resets gotMetaLockSlow to FALSE so that it will be ready for use by the predecessor thread in any subsequent contended monitor-access operation, as FIG. 9F indicates. A step in the part of its condvarWait( ) operation that T2 performed after it was awakened was to reacquire the mutex that guards its predecessor's execution environment, so it performs the twenty-sixth-line step of releasing that mutex. As FIG. 8's twenty-seventh, twenty-ninth, and fourth lines indicate, getMetaLock( ) then returns to the calling monitor-access operation the value communicated by thread T1 through thread T2's execution environment. From the point of view of thread T2's calling monitor-access operation, the result is just as though there had not been any contention for the meta-lock, and the lock word had accordingly been read from the object's header.

Having received that information, the calling monitor-access operation can proceed to completion. When it has done so, thread T2 calls FIG. 10's releaseMetaLock( ) operation to place the resultant releaseBits value in the appropriate location, i.e., in the object's header or one of the execution environments. Since the header's execution-environment pointer shows that a different thread has made an intervening attempt since thread T2 acquired the meta-lock that it is now releasing, thread T2 cannot place its releaseBits value in the header. Instead, it calls releaseMetaLockSlow( ), as thread T1 did, to place that information in an execution environment.

Thread T2's performance of releaseMetaLockSlow( ) differs from thread T1's, though, because thread T2 finds a NULL value in its succEE field: thread T2's successor has not identified itself. So thread T2 takes that routine's "else" branch, in which thread T2 stores the releaseBits value in its own execution environment rather than that of the (unidentified) successor. Specifically, thread T2 performs the twenty-second and twenty-third line's step. In that step, thread T2 places the releaseBits value in its own execution environment's metaLockBits field and sets its execution environment's bitsForGrab value equal to TRUE to indicate that the release value is ready. That is, that TRUE value indicates that the calling monitor-access operation's release-Bits output sits in the metaLockBits field of thread T2's execution environment ready for transmission to its successor. FIG. 9G shows the result.

Thread T2 then enters the do-while of FIG. 10's twenty-fourth through twenty-sixth lines. That loop releases the mutex that guards the execution environment of the executing thread (here T2), and it suspends that thread until some other thread signals on the condition variable used in connection with that mutex. This suspension is imposed to avoid a situation that could arise if the meta-lock-releasing thread were allowed to proceed. If it were, the releasing thread could go on to perform synchronization operations on other objects. These synchronization operations could cause the thread to overwrite its metaLockBits field before its original successor had retrieved that field's contents. The wait imposed by releaseMetaLock( ) suspends the executing thread until its successor has read those contents.

Let us now assume that thread T3 resumes getMetaLockSlow( ) at FIG. 8's tenth line, where we assumed in connection with FIG. 9D that the operating system's thread scheduler interrupted it. After thereupon obtaining a lock on the mutex that guards the execution environment of its predecessor, thread T2, it then determines whether the contents of the bitsForGrab field of its predecessor's execution environment is TRUE, i.e. whether its predecessor has stored its releaseBits value in its own metaLockBits field. Since thread T2 has indeed done so, thread T3 takes getMetaLockSlow( )'s first branch, in which it performs the fourteenth line's step of copying that field's contents. Note that the illustrated embodiment uses the same, metaLockBits field not only for release-value reception, as T2's did in the communication between threads T1 and T2, but also for release-value transmission, as T2's did in the communication between threads T2 and T3. But other embodiments may use different fields for the two purposes.

Thread T3 then performs getMetaLockSlow( )'s fifteenth-line step of resetting thread T2's bitsForGrab value to FALSE, as FIG. 9H indicates. Among other things, this prevents thread T2's successor with respect to some subsequent monitor-access operation from erroneously concluding that the subsequent operation's releaseBits output sits in thread T2's metaLockBits field ready for transmission to that successor. And, since thread T3 has already copied that field's contents, thread T2 can now resume execution. So thread T3 performs the sixteenth-line step of awakening thread T2 by signaling on the condition variable associated with the mutex that guards thread T2's execution environment. It then performs the seventeenth-line step of unlocking that mutex. As FIG. 8's twenty-seventh, twenty-ninth, and fourth lines indicate, getMetaLock( ) then returns to the calling monitor-access operation the value that it obtained from thread T2's execution environment.

Thread T3 accordingly proceeds to perform a locking operation corresponding to the one described above in connection with the transition from FIG. 7D to FIG. 7E.

Since thread T3 signaled on the condition variable upon which thread T2 had waited, the operating system awakens thread T2. Thread T2 thereupon completes releaseMetaLock( ) after verifying in the twenty-sixth-line step that thread T2 has reset thread T2's bitsForGrab value, i.e., that the successor thread has indeed read the release bits. FIG. 9I indicates that this results in no change to the object's header or the illustrated execution-environment fields.

Thread T3 eventually completes its locking operation, so it releases its meta-lock by calling releaseMetaLock( ). In this case, the compare-and-swap operation of FIG. 10's third and fourth lines finds that the contents of the object header's lock word are indeed the same as those that thread T3 left there during its acquisition of the meta-lock. That is, no other thread has attempted to obtain access to the monitor resources since thread T3 obtained the meta-lock. So the compare-and-swap operation is successful: its swap part proceeds, leaving the releaseBits result of thread T3's monitor-access operation's in the object's header, as FIG. 9J indicates. The FIG. 9J header state is the same as the state, depicted in FIG. 7E, that resulted when the same monitor-access-operation sequence was performed without meta-lock contention.

A review of the present invention's meta-locking approach reveals that it supports light-weight object locking with a minimum of storage or performance cost, yet it is versatile enough to be used with synchronization operations other than just locking. In a single atomic swap operation, a thread attempting to initiate a monitor-access operation (1) reserves the monitor resources ahead of any successors, (2) learns the object's current synchronization state if there is no predecessor, (3) learns the identity of any predecessor so that it can suspend itself after arranging for the predecessor to wake it up when the predecessor's results are available, and (4) identifies itself to any immediate successor for the same purpose. It thus avoids the need to engage in a wasteful busy-wait, or "spinning" cycles.

Moreover, although the illustrated embodiment was described in connection with the particular types of monitor resources depicted in FIGS. 7A–K, namely, a linked list of lock records associated with various threads that have performed monitor-access operations, a review of the meta-lock-acquisition and -release operations described above reveals that they do not depend on such resources at all, so they can be employed with other types of object-locking schemes. Also, although the illustrated embodiment's meta-lock-acquisition and -release operations advantageously involve reading from and writing to object-header fields that additionally are employed for other purposes (to contain the hash and age values, for instance), there is no reason in principle why the present invention's teachings cannot be employed in an arrangement in which the object header includes space dedicated solely to locking and meta-locking—or meta-locking only.

Also, there is no reason why the synchronization field needs to be realized in precisely the way the illustrated embodiment realizes it. If the meta-locking is used to guard only locking and unlocking, for instance, a single-bit synchronization field can be adequate. The synchronization field can also be realized as two constituent fields, one to indicate whether monitor access is in progress—i.e., whether the object is meta-locked—and another to represent the synchronization state that results when that access is finished.

The alternative features described above could be used with a header that has a dedicated lock word, for instance. If the meta-locking is used only for locking and unlocking, a single-bit field in the lock word could indicate whether the object is meta-locked, and the remainder of the lock word could specify the lock state by containing an identifier of the locking thread; i.e., a NULL value would indicate that the object is neither locked nor meta-locked.

Figure 11A:
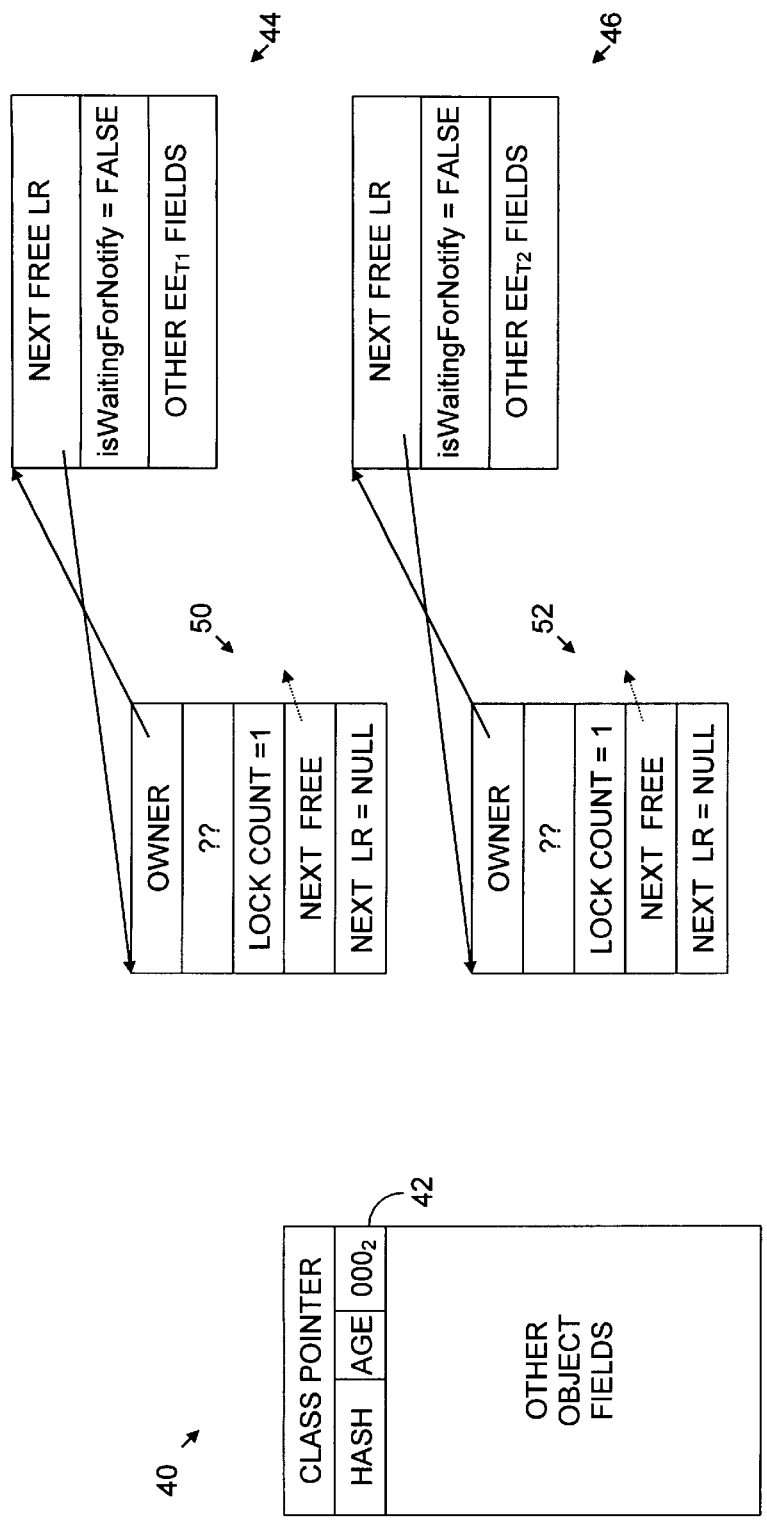
FIGS. 11A–F are diagrams of monitor resources as they change during a sequence of synchronization operations implemented in accordance with an alternative embodiment of the present invention.

Additionally, some embodiments will employ the meta-locking approach of FIGS. 8–10 only in certain circumstances. As an example, consider an implementation whose operation we describe in connection with FIGS. 11A–F. FIG. 11A is like FIG. 7A in that it illustrates a situation in which no thread is yet synchronized on the object. In the implementation that we now describe, though, lock-acquisition and -release operations are distinguished from other monitor-access operations in that they are not necessarily preceded by meta-lock acquisition. A thread that is to lock an object first reads the object header's lock word to determine whether any thread is already synchronized on it or has acquired its meta-lock. If any has, the thread proceeds essentially as described above, acquiring the object's meta-lock to guard the monitor access in which it will engage.

But we assume in this example that the object header's synchronization field 42 has the value that FIG. 11A depicts. Although the synchronization field in this implementation is, for reasons that will be explained below, three bits wide instead of two, we consider only its least-significant two bits for the time being. Their value, $00_2$, means that no thread has synchronized on the object or acquired a meta-lock on it.

Thread T1 therefore employs a short cut that takes advantage of the fact that locking the object under these circumstances will not require access to any other threads' lock records. As was explained above, lock acquisition under these circumstances simply involves placing the lock word's hash and age values in the appropriate field of the thread's first free lock record, removing that record from the free list, and replacing the object header's lock word with one that points to that lock record and contains the lock-indicating value in its synchronization field. If the other steps precede the lock-word replacement, those other steps are performed on structures to which other threads will not attempt access. This means that the lock acquisition can be accomplished without guarding if the replacement operation, i.e., the step performed on the structure to which other threads do have access, is performed as part of an atomic compare-and-swap operation in which the comparison ensures that no thread has synchronized on the object or acquired a meta-lock on it.

Figure 11B:
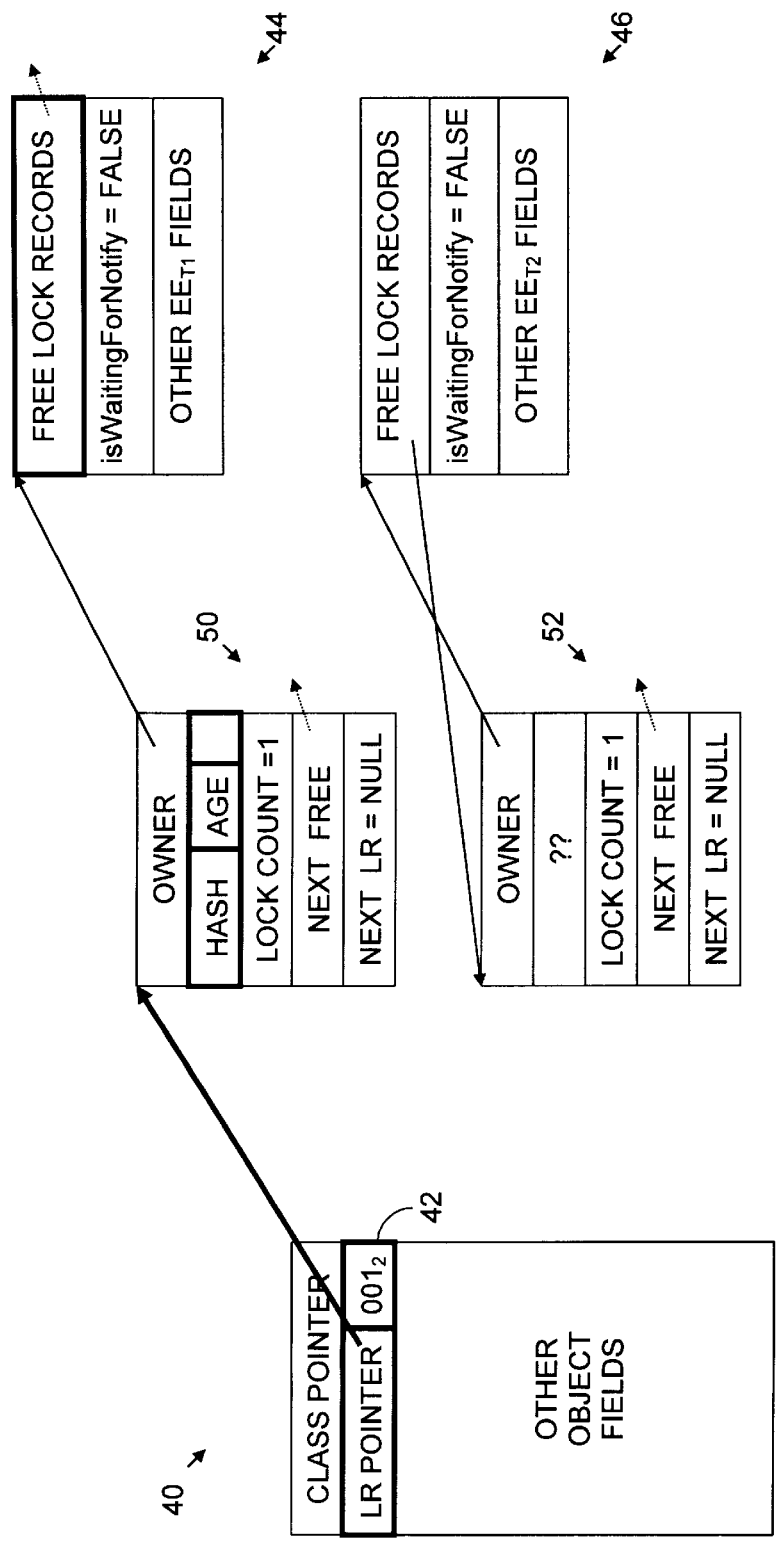

So thread T1 appropriately prepares lock record 50 and then performs an atomic compare-and-swap operation in which the expected value of the object-header's lock word still has the value previously read by thread T1 as indicating the absence of synchronization or a meta-lock. In the illustrated scenario, the comparison operation does indeed verify that the lock word has the expected value, so thread T1 replaces the lock word appropriately, as FIG. 11B illustrates. Thread T1 has thus locked the object without obtaining and releasing a meta-lock reflected in the object's header.

The absence of a need for access to other threads' lock records can also be taken advantage of when a thread is attempting to release an object on which no other thread is synchronized or owns a meta-lock. As was explained above, the release operation under these circumstances involves only replacing the object header's lock word with a value read from the unlocking thread's lock record; access is required only to the object header and the releasing thread's lock record. True, other threads have access to both of these structures. But a straightforward way to perform the lock-release operation safely is to use an atomic "double-compare-and-swap" operation that makes the replacement of the header's lock word conditional on the absence not only of any other thread's meta-lock ownership but also of any other synchronized thread, i.e., on the presence of a NULL value in the lock record's next-LR field.

Now, an atomic double-compare-and-swap operation is one that atomically compares the values in two memory locations against respective expected values for these locations and, if both comparisons match, replaces the contents of the memory locations with specified new values. To perform the lock-release operation by using double-compare-and-swap, the first memory location is the object header's lock-word field, and the second memory location is the next-LR field of the first lock record, and the swaps occur if the comparisons verify that the header's lock word still points to the releasing thread's lock record and that the next-LR field is NULL. One of the resultant swaps replaces the lock word with the stored hash and age values and the $00_2$ synchronization-state code. The other "replaces" the next-LR field's value with NULL, i.e., does not change it.

The expedited lock-release operation can be performed without meta-locking even if the system involved does not provide a double-compare-and-swap operation. An alternative for such systems is to have the object's header include a bit position whose value can act as an indication that the first lock record's next-LR bit is NULL. That is, a list-length indicator would be part of the lock word being replaced, so a single-record list length could be verified by a conventional compare-and-swap operation, as will be explained below.

One way to modify the above-described embodiment for this purpose is to make room for an extra bit in the synchronization field by requiring that the lock records and execution environments be eight-byte aligned so that the identifier field can be twenty-nine bits wide rather than thirty. This is the approach assumed in FIGS. 11A–F. A zero value is placed in that extra synchronization-field position by at least some monitor-access operations, such as the expedited lock-acquisition operation just described, that leave the object's linked lock-record list with only one lock record, i.e., with a NULL value in the first lock record's next-LR field. To support this approach, monitor-access operations must place a one in that extra bit position before they leave the object's linked lock-record list with more than one lock record: that position will contain a zero only if the first lock record's next-LR field is NULL.

Figure 11C:
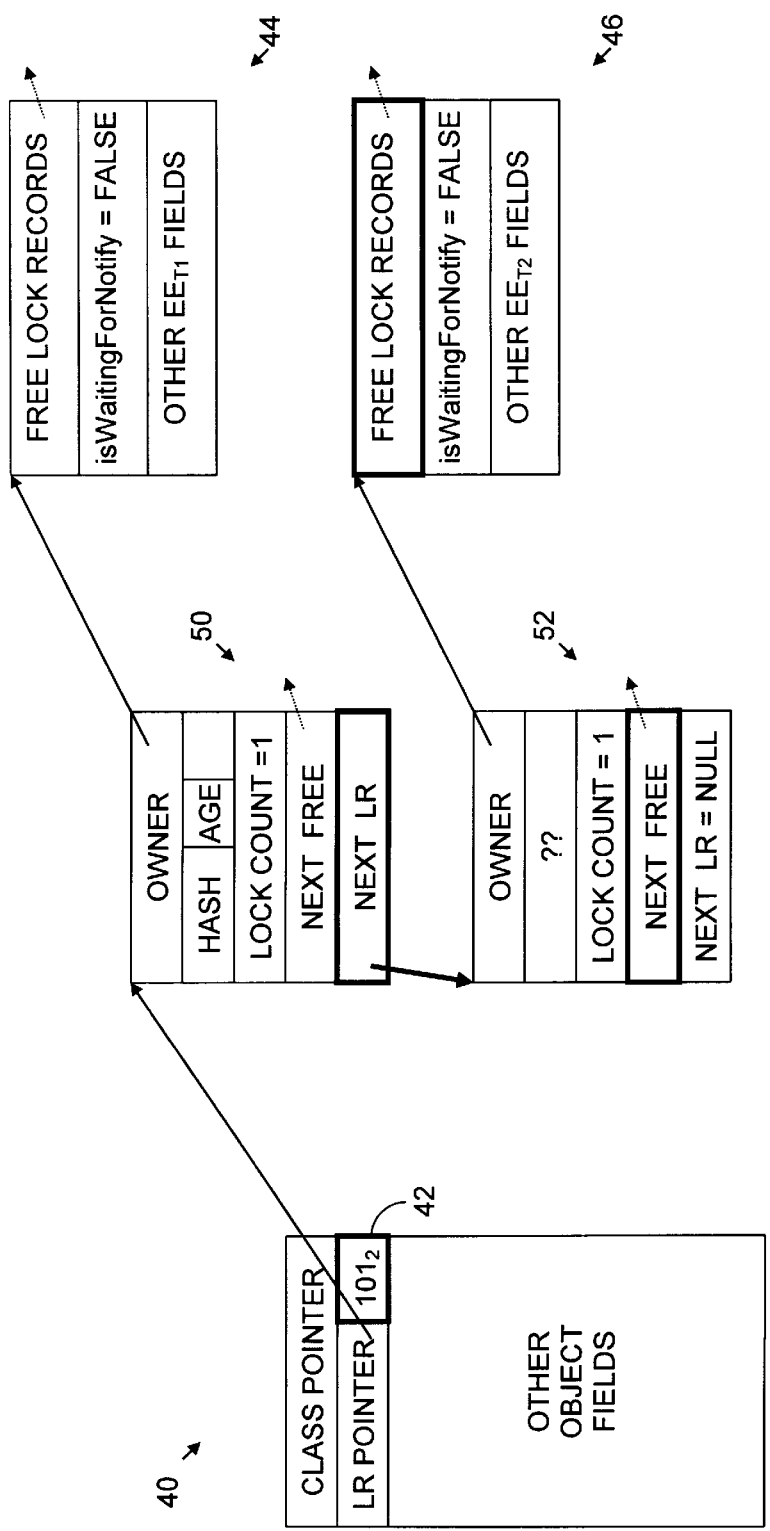

FIG. 11C illustrates the result of such an operation. Under the meta-lock's protection, thread T2 has placed itself in the queue of threads waiting to obtain a lock on the object, and in doing so it has set the synchronization field's most-significant bit to one, indicating that the object's linked lock-record list is greater than one lock record in length.

When thread T1 thereafter attempts to release the lock, it starts a possible fast lock-release operation by performing an atomic compare-and-swap operation in which the lock word expected to be found in the object's header consists of (1) the truncated pointer to the releasing thread's lock record and (2) a synchronization-state value of $001_2$. That $001_2$'s first digit would indicate that the pointed-to lock record's next-LR field has a NULL value. Its last two digits represent the locked state, as before. But the compare-and-swap operation fails, because the synchronization-state value is $101_2$, not $001_2$. This means that the lock-release operation will involve access to another thread's lock record. So thread T1 cannot use the short cut even though the object's header is otherwise just as thread T1 left it. Thread T1 therefore uses meta-locking to release its lock. As FIG. 11D indicates, thread T2's lock-release operation involved writing the hash and age values into thread T2's lock record. It is this access that prevented thread T1 from using the short cut.

Figure 11D:
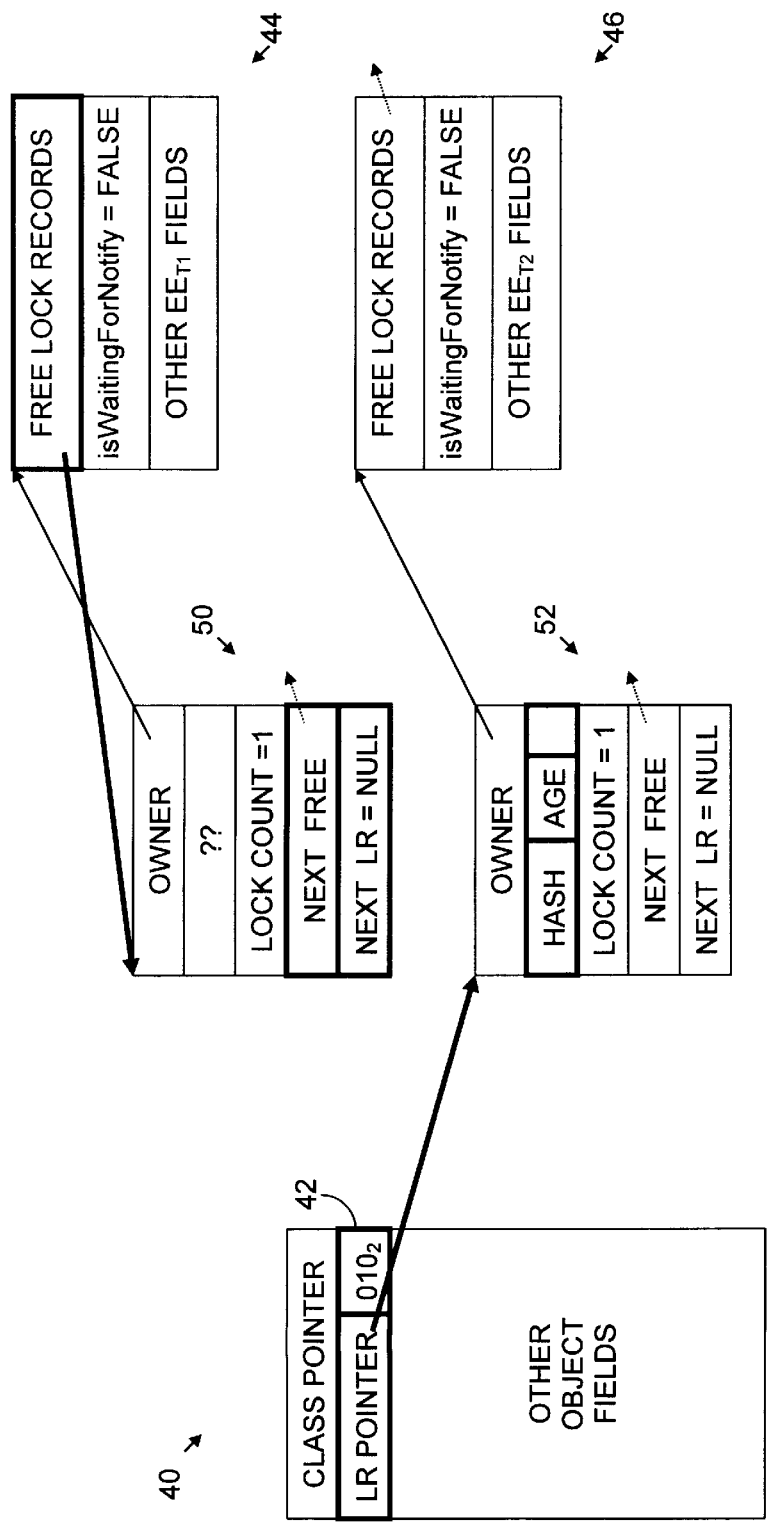
Figure 11E:
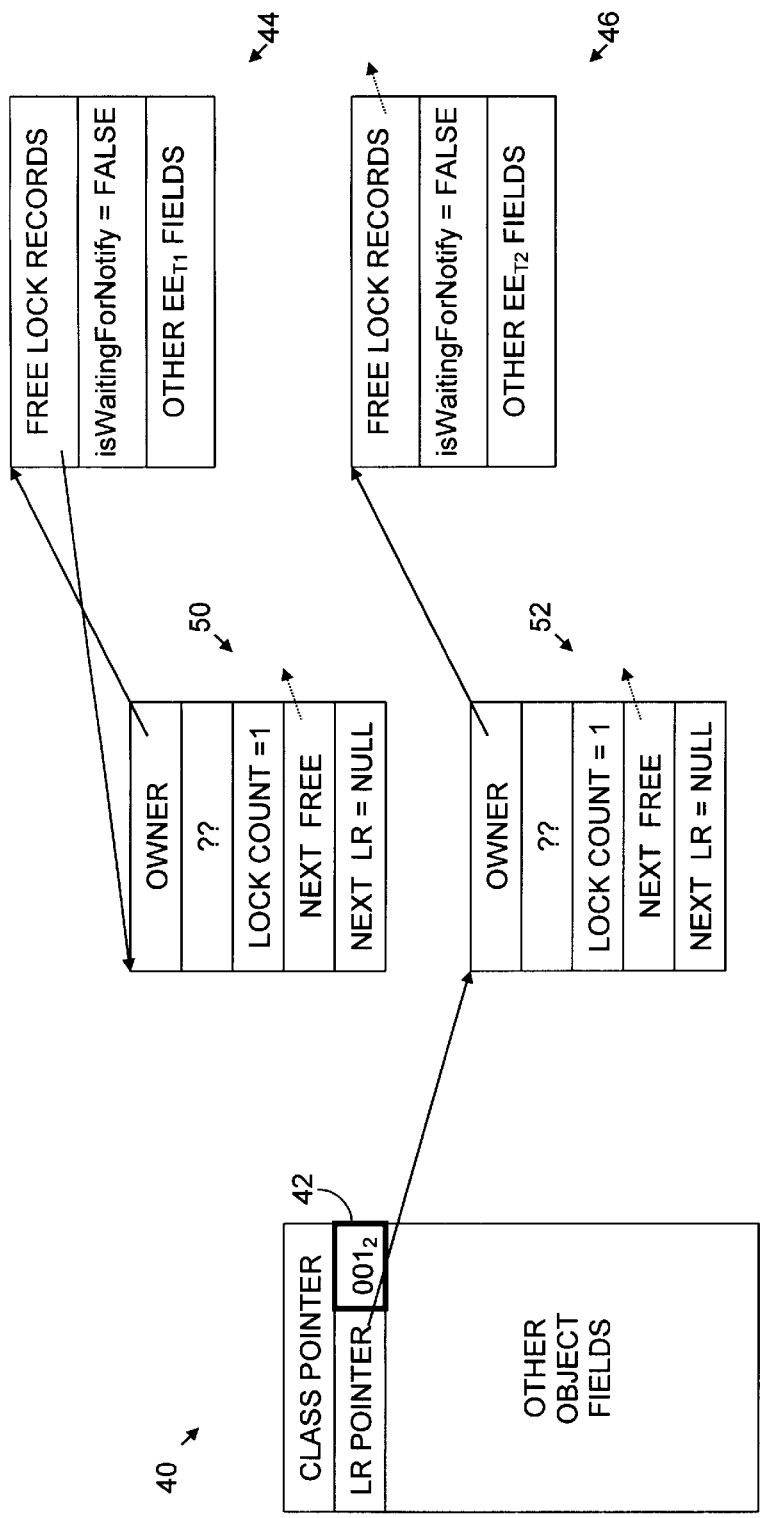

In some implementations, not all monitor-access operations will reset the synchronization-state field's most-significant bit to zero whenever they leave the object's list with at most one lock record. For example, some may reset that bit only during expedited lock-acquisition operations. But FIG. 11D shows that thread T1's lock-release operation has indeed reset it. So thread T2 is able to perform the expedited lock acquisition after thread T1 releases the lock, and FIG. 11E depicts the result.

Figure 11F:
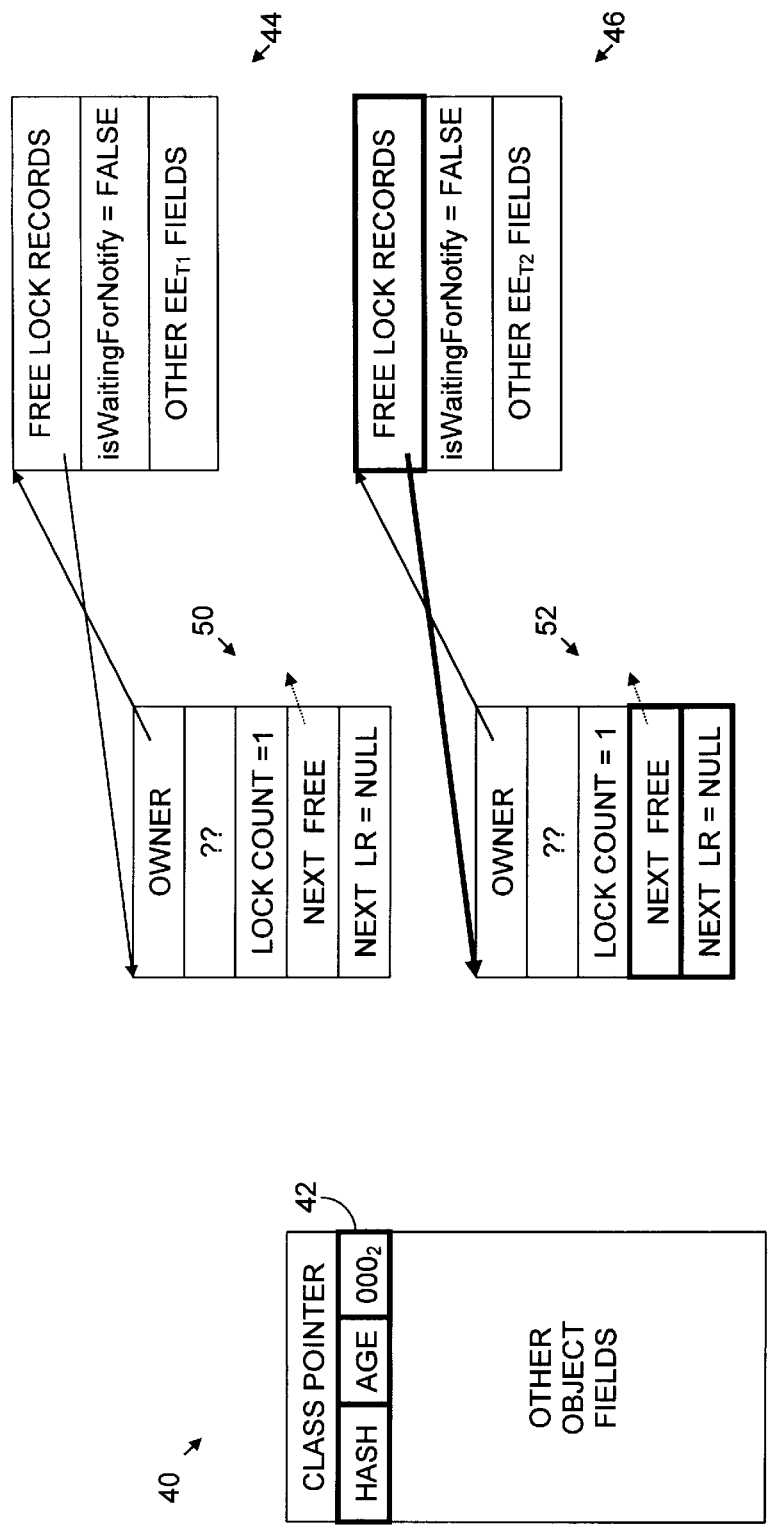

When T2 thereafter releases the lock, it attempts to employ the expedited lock-release operation, and this attempt succeeds. Specifically, the object's lock record now contains exactly the value that thread T2 left in it. In particular, the synchronization-state field's most-significant bit is still zero, so there is still only one lock record in the object's list. The compare-and-swap operation therefore succeeds. Since the lock-release operation removes the sole lock record from the list, the replacement lock word's identifier field will contain the stored hash and age values rather than a pointer to the object's (now empty) linked lock-record list as FIG. 11F illustrates, and the value of its synchronization-state field will be $000_2$ to indicate that there is at most one lock record and no locks, waiters, or meta-locks. The lock will thereby have been released without acquiring or releasing the meta-lock.

The present invention can therefore be employed in a wide range of embodiments and thus constitutes a significant advance in the art.

What is claimed is:
1. A computer system configured by computer instructions to operate as a compiler/interpreter that:
   A) in response to electrical signals representing source code that calls for execution of multiple execution threads, produces electrical signals representing object code that for each thread directs a processor to allocate an execution environment that includes a successor-identifier field, a release-value-reception field, and a release-value-transmission field;
   B) in response to electrical signals representing source code that calls for allocation of an object on which thread execution can be synchronized, produces electrical signals representing object code that directs a processor to allocate to the object an object structure that includes an identifier field and a synchronization-state field; and
   C) in response to electrical signals representing source code that calls for a synchronizing execution thread to perform any one of a set of at least one monitor-access operation with respect to the object, produces electrical signals representing object code that directs a processor to perform a monitor-access operation that:
      i) begins with a meta-lock-acquisition operation in which the synchronizing execution thread:
         a) performs an atomic swap operation in which the synchronizing execution thread swaps pre-acquisition identifier-field and synchronization-state-field contents for an identifier of the synchronizing execution thread and a predetermined busy code; and
         b) if the pre-acquisition synchronization-state-field contents are the busy code, performs a slow-meta-lock operation in which the synchronizing execution thread copies a release value from the release-value-reception field of the synchronizing execution thread's execution environment or from the release-value-transmission field of a predecessor thread's execution environment;
      ii) produces a release value by executing in accordance with the pre-acquisition synchronization-state-field contents if the pre-acquisition synchronization-state-field contents are not the busy code and by otherwise executing in accordance with the copied release value; and
      iii) ends with a meta-lock-release operation, in which the synchronizing execution thread:
         a) performs an atomic compare-and-swap operation that:
            (1) is successful, replacing pre-release contents of the object's identifier field and replacing pre-release contents of the object's synchronization-state field with a synchronization-state code other than the busy code, if the pre-release contents of the object's identifier field identify the synchronizing execution thread and the pre-release contents of the object's synchronization-state field are the busy code; and
            (2) is otherwise unsuccessful and does not replace the pre-release contents of the object's identifier and synchronization-state fields; and
         b) if the atomic compare-and-swap operation is unsuccessful, performs a slow-meta-lock-release operation, in which the synchronizing execution thread makes a determination of whether the contents of a successor-identifier field in its execution environment identify a successor thread and:

(1) if so, places a release value in the release-value-reception field of the successor thread's execution environment; and
(2) if not, places the release value in the release-value-transmission field of its own execution environment.

2. A computer system as defined in claim 1 wherein the release-value-reception and -transmission fields are the same field.

3. A computer system as defined in claim 1 wherein:
A) each execution environment allocated to a thread includes a release-value-received field;
B) the slow-meta-lock-release operation includes placing a predetermined reception-indicating value in the release-value-received field of the execution environment of the synchronizing execution thread's successor when the synchronizing execution thread places the release value in the release-value-reception field of the successor thread's execution environment; and
C) the slow-meta-lock-acquisition operation includes preceding the synchronizing execution thread's copying of the release value from the release-value-reception field with the synchronizing execution thread's reading of the predetermined reception-indicating value from the release-value-received field.

4. A computer system as defined in claim 1 wherein the synchronizing execution thread makes the determination of whether the contents of the successor-identifier field in its execution environment identifies a successor thread by concluding that its execution environment does contain a successor identifier if a successor-identifier field therein does not contain a predetermined no-identifier-indicating value.

5. A computer system as defined in claim 1 wherein:
A) the slow-meta-lock-acquisition operation includes making a determination of whether the predecessor thread has updated the release-value-transmission field of the predecessor thread's execution environment;
B) if so, the field from which the synchronizing execution thread copies the release value is the release-value-transmission field of the predecessor thread's execution environment; and
C) if not, the field from which the synchronizing execution thread copies the release value is the release-value-reception field of the synchronizing execution thread's execution environment.

6. A computer system as defined in claim 5 wherein the synchronizing execution thread makes the determination of whether the contents of the successor-identifier field in its execution environment identifies a successor thread by concluding that its execution environment does contain a successor identifier if a successor-identifier field therein does not contain a predetermined no-identifier-indicating value.

7. A computer system as defined in claim 5 wherein:
A) each execution environment allocated to a thread includes a release-value-ready field;
B) the slow-meta-lock-release operation includes placing a predetermined ready-indicating value in the release-value-ready field of the synchronizing execution thread's execution environment when the synchronizing execution thread places the release value in the release-value-transmission field of the synchronizing execution thread's execution environment; and
C) the determination of whether the predecessor thread has updated the release-value-transmission field of the predecessor thread's execution environment is based on the contents of the release-value-ready field of the predecessor thread's execution environment.

8. A computer system as defined in claim 5 wherein:
A. each execution environment allocated to a thread includes a release-value-received field;
B. the slow-meta-lock-release operation includes placing a predetermined reception-indicating value in the release-value-received field of the execution environment of the synchronizing execution thread's successor when the synchronizing execution thread places the release value in the release-value-reception field of the successor thread's execution environment; and
C. the slow-meta-lock-acquisition operation includes preceding the synchronizing execution thread's copying of the release value from the release-value-reception field with the synchronizing execution thread's reading of the predetermined reception-indicating value from the release-value-received field.

9. A computer system as defined in claim 8 wherein:
A. each execution environment allocated to a thread includes a release-value-ready field;
B. the slow-meta-lock-release operation includes placing a predetermined ready-indicating value in the release-value-ready field of the synchronizing execution thread's execution environment when the synchronizing execution thread places the release value in the release-value-transmission field of the synchronizing execution thread's execution environment; and
C. the determination of whether the predecessor thread has updated the release-value-transmission field of the predecessor thread's execution environment is based on the contents of the release-value-ready field of the predecessor thread's execution environment.

10. A computer system as defined in claim 1 wherein, when any thread is synchronized on a given object at the end of any said monitor-access operation performed on that object, that monitor-access operation results in a linked lock-record list, associated with that object, that comprises a lock record associated with each such thread.

11. A computer system as defined in claim 10 wherein each lock record associated with a thread includes an owner field, which contains an identifier of the thread with which the lock record is associated.

12. A computer system as defined in claim 11 wherein the identifier contained in the owner field of a lock record is a pointer to the execution environment of the thread with which that lock record is identified.

13. A computer system as defined in claim 10 wherein one said monitor-access operation is a locking operation, which results in the linked list's beginning with a lock record associated with the synchronizing execution thread.

14. A computer system as defined in claim 10 wherein, if any thread is synchronized on a given object at the end of any said monitor-access operation thereon and the atomic compare-and-swap operation of the meta-lock-release operation with which that monitor-access operation ends is successful, that meta-lock-release operation places in the object's identifier field a linked-list identifier that identifies the linked lock-record list associated with that object.

15. A computer system as defined in claim 10 wherein, if any thread is synchronized on a given object at the end of any said monitor-access operation thereon in which the atomic compare-and-swap operation is unsuccessful, the release value placed into an execution environment during the resultant slow-meta-lock-release operation includes a linked-list identifier that identifies the linked lock-record list associated with that object.

16. A computer system as defined in claim 15 wherein, if any thread is synchronized on a given object at the end of any said monitor-access operation thereon and the atomic compare-and-swap operation of the meta-lock-release operation with which that monitor-access operation ends is successful, that meta-lock-release operation places in the object's identifier field a linked-list identifier that identifies the linked lock-record list associated with that object.

17. A computer system as defined in claim 16 wherein the linked-list identifier is an identifier of the first lock record in the linked list.

18. A computer system as defined in claim 17 wherein the identifier of the first lock record in the linked list is a pointer to the first lock record in the linked list.

19. A computer system as defined in claim 18 wherein the linked-list identifier is a truncated pointer to the first lock record in the linked list.

20. A method of generating object code comprising the steps of:
   A) in response to source code that calls for execution of multiple execution threads, producing object code that for each thread directs a processor to allocate an execution environment that includes a successor-identifier field, a release-value-reception field, and a release-value-transmission field;
   B) in response to source code that calls for allocation of an object on which thread execution can be synchronized, producing object code that directs a processor to allocate to the object an object structure that includes an identifier field and a synchronization-state field; and
   C) in response to source code that calls for a synchronizing execution thread to perform any one of a set of at least one monitor-access operation with respect to the object, producing object code that directs a processor to perform a monitor-access operation that:
      i) begins with a meta-lock-acquisition operation in which the synchronizing execution thread:
         a) performs an atomic swap operation in which the synchronizing execution thread swaps pre-acquisition identifier-field and synchronization-state-field contents for an identifier of the synchronizing execution thread and a predetermined busy code; and
         b) if the pre-acquisition synchronization-state-field contents are the busy code, performs a slow-meta-lock operation in which the synchronizing execution thread copies a release value from the release-value-reception field of the synchronizing execution thread's execution environment or from the release-value-transmission field of a predecessor thread's execution environment;
      ii) produces a release value by executing in accordance with the pre-acquisition synchronization-state-field contents if the pre-acquisition synchronization-state-field contents are not the busy code and by otherwise executing in accordance with the copied release value; and
      iii) ends with a meta-lock-release operation, in which the synchronizing execution thread:
         a) performs an atomic compare-and-swap operation that:
            (1) is successful, replacing pre-release contents of the object's identifier field and replacing pre-release contents of the object's synchronization-state field with a synchronization-state code other than the busy code, if the pre-release contents of the object's identifier field identify the synchronizing execution thread and the pre-release contents of the object's synchronization-state field are the busy code; and
            (2) is otherwise unsuccessful and does not replace the pre-release contents of the object's identifier and synchronization-state fields; and
         b) if the atomic compare-and-swap operation is unsuccessful, performs a slow-meta-lock-release operation, in which the synchronizing execution thread makes a determination of whether the contents of a successor-identifier field in its execution environment identifies a successor thread and:
            (3) if so, places a release value in the release-value-reception field of the successor thread's execution environment; and
            (4) if not, places the release value in the release-value-transmission field of its own execution environment.

21. A method as defined in claim 20 wherein the release-value-reception and -transmission fields are the same field.

22. A method as defined in claim 20 wherein:
   A) each execution environment allocated to a thread includes a release-value-received field;
   B) the slow-meta-lock-release operation includes placing a predetermined reception-indicating value in the release-value-received field of the execution environment of the synchronizing execution thread's successor when the synchronizing execution thread places the release value in the release-value-reception field of the successor thread's execution environment; and
   C) the slow-meta-lock-acquisition operation includes preceding the synchronizing execution thread's copying of the release value from the release-value-reception field with the synchronizing execution thread's reading of the predetermined reception-indicating value from the release-value-received field.

23. A method as defined in claim 20 wherein the synchronizing execution thread makes the determination of whether the contents of the successor-identifier field in its execution environment identifies a successor thread by concluding that its execution environment does contain a successor identifier if a successor-identifier field therein does not contain a predetermined no-identifier-indicating value.

24. A method as defined in claim 20 wherein:
   A) the slow-meta-lock-acquisition operation includes making a determination of whether the predecessor thread has updated the release-value-transmission field of the predecessor thread's execution environment;
   B) if so, the field from which the synchronizing execution thread copies the release value is the release-value-transmission field of the predecessor thread's execution environment; and
   C) if not, the field from which the synchronizing execution thread copies the release value is the release-value-reception field of the synchronization execution thread's execution environment.

25. A method as defined in claim 24 wherein the synchronizing execution thread makes the determination of whether the contents of the successor-identifier field in its execution environment identifies a successor thread by concluding that its execution environment does contain a successor identifier if a successor-identifier field therein does not contain a predetermined no-identifier-indicating value.

26. A method as defined in claim 24 wherein:
   A) each execution environment allocated to a thread includes a release-value-ready field;

B) the slow-meta-lock-release operation includes placing a predetermined ready-indicating value in the release-value-ready field of the synchronizing execution thread's execution environment when the synchronizing execution thread places the release value in the release-value-transmission field of the synchronizing execution thread's execution environment; and C) the determination of whether the predecessor thread has updated the release-value-transmission field of the predecessor thread's execution environment is based on the contents of the release-value-ready field of the predecessor thread's execution environment.

27. A method as defined in claim 24 wherein:

A) each execution environment allocated to a thread includes a release-value-received field;

B) the slow-meta-lock-release operation includes placing a predetermined reception-indicating value in the release-value-received field of the execution environment of the synchronizing execution thread's successor when the synchronizing execution thread places the release value in the release-value-reception field of the successor thread's execution environment; and C) the slow-meta-lock-acquisition operation includes preceding the synchronizing execution thread's copying of the release value from the release-value-reception field with the synchronizing execution thread's reading of the predetermined reception-indicating value from the release-value-received field.

28. A method as defined in claim 27 wherein:

A) each execution environment allocated to a thread includes a release-value-ready field;

B) the slow-meta-lock-release operation includes placing a predetermined ready-indicating value in the release-value-ready field of the synchronizing execution thread's execution environment when the synchronizing execution thread places the release value in the release-value-transmission field of the synchronizing execution thread's execution environment; and C) the determination of whether the predecessor thread has updated the release-value-transmission field of the predecessor thread's execution environment is based on the contents of the release-value-ready field of the predecessor thread's execution environment.

29. A method as defined in claim 20 wherein, when any thread is synchronized on a given object at the end of any said monitor-access operation performed on that object, that monitor-access operation results in a linked lock-record list, associated with that object, that comprises a lock record associated with each such thread.

30. A method as defined in claim 29 wherein each lock record associated with a thread includes an owner field, which contains an identifier of the thread with which the lock record is associated.

31. A method as defined in claim 30 wherein the identifier contained in the owner field of a lock record is a pointer to the execution environment of the thread with which that lock record is identified.

32. A method as defined in claim 29 wherein one said monitor-access operation is a locking operation, which results in the linked list's beginning with a lock record associated with the synchronizing execution thread.

33. A method as defined in claim 29 wherein, if any thread is synchronized on a given object at the end of any said monitor-access operation thereon and the atomic compare-and-swap operation of the meta-lock-release operation with which that monitor-access operation ends is successful, that meta-lock-release operation places in the object's identifier field a linked-list identifier that identifies the linked lock-record list associated with that object.

34. A method as defined in claim 29 wherein, if any thread is synchronized on a given object at the end of any said monitor-access operation thereon in which the atomic compare-and-swap operation is unsuccessful, the release value placed into an execution environment during the resultant slow-meta-lock-release operation includes a linked-list identifier that identifies the linked lock-record list associated with that object.

35. A method as defined in claim 34 wherein, if any thread is synchronized on a given object at the end of any said monitor-access operation thereon and the atomic compare-and-swap operation of the meta-lock-release operation with which that monitor-access operation ends is successful, that meta-lock-release operation places in the object's identifier field a linked-list identifier that identifies the linked lock-record list associated with that object.

36. A method as defined in claim 35 wherein the linked-list identifier is an identifier of the first lock record in the linked list.

37. A method as defined in claim 36 wherein the identifier of the first lock record in the linked list is a pointer to the first lock record in the linked list.

38. A method as defined in claim 37 wherein the linked-list identifier is a truncated pointer to the first lock record in the linked list.

39. A computer data signal embodied in a carrier wave and representing a sequence of instructions that, when executed by a computer system, configures the computer system to operate as a compiler/interpreter that:

A) in response to electrical signals representing source code that calls for execution of multiple execution threads, produces electrical signals representing object code that for each thread directs a processor to allocate an execution environment that includes a successor-identifier field, a release-value-reception field, and a release-value-transmission field;

B) in response to electrical signals representing source code that calls for allocation of an object on which thread execution can be synchronized, produces electrical signals representing object code that directs a processor to allocate to the object an object structure that includes an identifier field and a synchronization-state field; and C) in response to electrical signals representing source code that calls for a synchronizing execution thread to perform any one of a set of at least one monitor-access operation with respect to the object, produces electrical signals representing object code that directs a processor to perform a monitor-access operation that:

i) begins with a meta-lock-acquisition operation in which the synchronizing execution thread:

a) performs an atomic swap operation in which the synchronizing execution thread swaps pre-acquisition identifier-field and synchronization-state-field contents for an identifier of the synchronizing execution thread and a predetermined busy code; and b) if the pre-acquisition synchronization-state-field contents are the busy code, performs a slow-meta-lock operation in which the synchronizing execution thread copies a release value from the release-value-reception field of the synchronizing execution thread's execution environment or from the release-value-transmission field of a predecessor thread's execution environment;

ii) produces a release value by executing in accordance with the pre-acquisition synchronization-state-field contents if the pre-acquisition synchronization-state-field contents are not the busy code and by otherwise executing in accordance with the copied release value; and iii) ends with a meta-lock-release operation, in which the synchronizing execution thread:
  a) performs an atomic compare-and-swap operation that:
    (1) is successful, replacing pre-release contents of the object's identifier field and replacing pre-release contents of the object's synchronization-state field with a synchronization-state code other than the busy code, if the pre-release contents of the object's identifier field identify the synchronizing execution thread and the pre-release contents of the object's synchronization-state field are the busy code; and
    (2) is otherwise unsuccessful and does not replace the pre-release contents of the object's identifier and synchronization-state fields; and
  b) if the atomic compare-and-swap operation is unsuccessful, performs a slow-meta-lock-release operation, in which the synchronizing execution thread makes a determination of whether the contents of a successor-identifier field in its execution environment identifies a successor thread and:
    (1) if so, places a release value in the release-value-reception field of the successor thread's execution environment; and
    (2) if not, places the release value in the release-value-transmission field of its own execution environment.

40. A computer data signal as defined in claim 39 wherein the release-value-reception and -transmission fields are the same field.

41. A computer data signal as defined in claim 39 wherein:
A) each execution environment allocated to a thread includes a release-value-received field;
B) the slow-meta-lock-release operation includes placing a predetermined reception-indicating value in the release-value-received field of the execution environment of the synchronizing execution thread's successor when the synchronizing execution thread places the release value in the release-value-reception field of the successor thread's execution environment; and
C) the slow-meta-lock-acquisition operation includes preceding the synchronizing execution thread's copying of the release value from the release-value-reception field with the synchronizing execution thread's reading of the predetermined reception-indicating value from the release-value-received field.

42. A computer data signal as defined in claim 39 wherein the synchronizing execution thread makes the determination of whether the contents of the successor-identifier field in its execution environment identifies a successor thread by concluding that its execution environment does contain a successor identifier if a successor-identifier field therein does not contain a predetermined no-identifier-indicating value.

43. A computer data signal as defined in claim 39 wherein:
A) the slow-meta-lock-acquisition operation includes making a determination of whether the predecessor thread has updated the release-value-transmission field of the predecessor thread's execution environment;
B) if so, the field from which the synchronizing execution thread copies the release value is the release-value-transmission field of the predecessor thread's execution environment; and
C) if not, the field from which the synchronizing execution thread copies the release value is the release-value-reception field of the synchronizing execution thread's execution environment.

44. A computer data signal as defined in claim 43 wherein the synchronizing execution thread makes the determination of whether the contents of the successor-identifier field in its execution environment identifies a successor thread by concluding that its execution environment does contain a successor identifier if a successor-identifier field therein does not contain a predetermined no-identifier-indicating value.

45. A computer data signal as defined in claim 43 wherein:
A) each execution environment allocated to a thread includes a release-value-ready field;
B) the slow-meta-lock-release operation includes placing a predetermined ready-indicating value in the release-value-ready field of the synchronizing execution thread's execution environment when the synchronizing execution thread places the release value in the release-value-transmission field of the synchronizing execution thread's execution environment; and
C) the determination of whether the predecessor thread has updated the release-value-transmission field of the predecessor thread's execution environment is based on the contents of the release-value-ready field of the predecessor thread's execution environment.

46. A computer data signal as defined in claim 43 wherein:
A) each execution environment allocated to a thread includes a release-value-received field;
B) the slow-meta-lock-release operation includes placing a predetermined reception-indicating value in the release-value-received field of the execution environment of the synchronizing execution thread's successor when the synchronizing execution threads places the release value in the release-value-reception field of the successor thread's execution environment; and
C) the slow-meta-lock-acquisition operation includes preceding the synchronizing execution thread's copying of the release value from the release-value-reception field with the synchronizing execution thread's reading of the predetermined reception-indicating value from the release-value-received field.

47. A computer data signal as defined in claim 46 wherein:
A) each execution environment allocated to a thread includes a release-value-ready field;
B) the slow-meta-lock-release operation includes placing a predetermined ready-indicating value in the release-value-ready field of the synchronizing execution thread's execution environment when the synchronizing execution thread places the release value in the release-value-transmission field of the synchronizing execution thread's execution environment; and
C) the determination of whether the predecessor thread has updated the release-value-transmission field of the predecessor thread's execution environment is based on the contents of the release-value-ready field of the predecessor thread's execution environment.

48. A computer data signal as defined in claim 39 wherein, when any thread is synchronized on a given object at the end of any said monitor-access operation performed on with that object, that comprises a lock record associated with each such thread.

49. A computer data signal as defined in claim 48 wherein each lock record associated with a thread includes an owner field, which contains an identifier of the thread with which the lock record is associated.

50. A computer data signal as defined in claim 49 wherein the identifier contained in the owner field of a lock record is a pointer to the execution environment of the thread with which that lock record is identified.

51. A computer data signal as defined in claim 48 wherein one said monitor-access operation is a locking operation, which results in the linked list's beginning with a lock record associated with the synchronizing execution thread.

52. A computer data signal as defined in claim 48 wherein, if any thread is synchronized on a given object at the end of any said monitor-access operation thereon and the atomic compare-and-swap operation of the meta-lock-release operation with which that monitor-access operation ends is successful, that meta-lock-release operation places in the object's identifier field a linked-list identifier that identifies the linked lock-record list associated with that object.

53. A computer data signal as defined in claim 48 wherein, if any thread is synchronized on a given object at the end of any said monitor-access operation thereon in which the atomic compare-and-swap operation is unsuccessful, the release value placed into an execution environment during the resultant slow-meta-lock-release operation includes a linked-list identifier that identifies the linked lock-record list associated with that object.

54. A computer data signal as defined in claim 53 wherein, if any thread is synchronized on a given object at the end of any said monitor-access operation thereon and the atomic compare-and-swap operation of the meta-lock-release operation with which that monitor-access operation ends is successful, that meta-lock-release operation places in the object's identifier field a linked-list identifier that identifies the linked lock-record list associated with that object.

55. A computer data signal as defined in claim 54 wherein the linked-list identifier is an identifier of the first lock record in the linked list.

56. A computer data signal as defined in claim 55 wherein the identifier of the first lock record in the linked list is a pointer to the first lock record in the linked list.

57. A computer data signal as defined in claim 56 wherein the linked-list identifier is a truncated pointer to the first lock record in the linked list.

58. A storage medium containing instructions readable by a computer system to configure the computer system as a compiler/interpreter that:
A) in response to electrical signals representing source code that calls for execution of multiple execution threads, produces electrical signals representing object code that for each thread directs a processor to allocate an execution environment that includes a successor-identifier field, a release-value-reception field, and a release-value-transmission field;
B) in response to electrical signals representing source code that calls for allocation of an object on which thread execution can be synchronized, produces electrical signals representing object code that directs a processor to allocate to the object an object structure that includes an identifier field and a synchronization-state field; and
C) in response to electrical signals representing source code that calls for a synchronizing execution thread to perform any one of a set of at least one monitor-access operation with respect to the object, produces electrical signals representing object code that directs a processor to perform a monitor-access operation that:
i) begins with a meta-lock-acquisition operation in which the synchronizing execution thread:
a) performs an atomic swap operation in which the synchronizing execution thread swaps pre-acquisition identifier-field and synchronization-state-field contents for an identifier of the synchronizing execution thread and a predetermined busy code; and
b) if the pre-acquisition synchronization-state-field contents are the busy code, performs a slow-meta-lock operation in which the synchronizing execution thread copies a release value from the release-value-reception field of the synchronizing execution thread's execution environment or from the release-value-transmission field of a predecessor thread's execution environment;
ii) produces a release value by executing in accordance with the pre-acquisition synchronization-state-field contents if the pre-acquisition synchronization-state-field contents are not the busy code and by otherwise executing in accordance with the copied release value; and
iii) ends with a meta-lock-release operation, in which the synchronizing execution thread:
a) performs an atomic compare-and-swap operation that:
(1) is successful, replacing pre-release contents of the object's identifier field and replacing pre-release contents of the object's synchronization-state field with a synchronization-state code other than the busy code, if the pre-release contents of the object's identifier field identify the synchronizing execution thread and the pre-release contents of the object's synchronization-state field are the busy code; and
(2) is otherwise unsuccessful and does not replace the pre-release contents of the object's identifier and synchronization-state fields; and
b) if the atomic compare-and-swap operation is unsuccessful, performs a slow-meta-lock-release operation, in which the synchronizing execution thread makes a determination of whether the contents of a successor-identifier field in its execution environment identifies a successor thread and:
(1) if so, places a release value in the release-value-reception field of the successor thread's execution environment; and
(2) if not, places the release value in the release-value-transmission field of its own execution environment.

59. A storage medium as defined in claim 58 wherein the release-value-reception and -transmission fields are the same field.

60. A storage medium as defined in claim 58 wherein:
A) each execution environment allocated to a thread includes a release-value-received field;
B) the slow-meta-lock-release operation includes placing a predetermined reception-indicating value in the release-value-received field of the execution environment of the synchronizing execution thread's successor when the synchronizing execution thread places the release value in the release-value-reception field of the successor thread's execution environment; and
C) the slow-meta-lock-acquisition operation includes preceding the synchronizing execution thread's copying of the release value from the release-value-reception field with the synchronizing execution thread's reading of the predetermined reception-indicating value from the release-value-received field.

61. A storage medium as defined in claim 58 wherein the synchronizing execution thread makes the determination of whether the contents of the successor-identifier field in its execution environment identifies a successor thread by concluding that its execution environment does contain a successor identifier if a successor-identifier field therein does not contain a predetermined no-identifier-indicating value.

62. A storage medium as defined in claim 58 wherein:
A) the slow-meta-lock-acquisition operation includes making a determination of whether the predecessor thread has updated the release-value-transmission field of the predecessor thread's execution environment;
B) if so, the field from which the synchronizing execution thread copies the release value is the release-value-transmission field of the predecessor thread's execution environment; and
C) if not, the field from which the synchronizing execution thread copies the release value is the release-value-reception field of the synchronizing execution thread's execution environment.

63. A storage medium as defined in claim 62 wherein the synchronizing execution thread makes the determination of whether the contents of the successor-identifier field in its execution environment identifies a successor thread by concluding that its execution environment does contain a successor identifier if a successor-identifier field therein does not contain a predetermined no-identifier-indicating value.

64. A storage medium as defined in claim 62 wherein:
A) each execution environment allocated to a thread includes a release-value-ready field;
B) the slow-meta-lock-release operation includes placing a predetermined ready-indicating value in the release-value-ready field of the synchronizing execution thread's execution environment when the synchronizing execution thread places the release value in the release-value-transmission field of the synchronizing execution thread's execution environment; and
C) the determination of whether the predecessor thread has updated the release-value-transmission field of the predecessor thread's execution environment is based on the contents of the release-value-ready field of the predecessor thread's execution environment.

65. A storage medium as defined in claim 62 wherein:
A) each execution environment allocated to a thread includes a release-value-received field;
B) the slow-meta-lock-release operation includes placing a predetermined reception-indicating value in the release-value-received field of the execution environment of the synchronizing execution thread's successor when the synchronizing execution thread places the release value in the release-value-reception field of the successor thread's execution environment; and
C) the slow-meta-lock-acquisition operation includes preceding the synchronizing execution thread's copying of the release value from the release-value-reception field with the synchronizing execution thread's reading of the predetermined reception-indicating value from the release-value-received field.

66. A storage medium as defined in claim 65 wherein:
A) each execution environment allocated to a thread includes a release-value-ready field;
B) the slow-meta-lock-release operation includes placing a predetermined ready-indicating value in the release-value-ready field of the synchronizing execution thread's execution environment when the synchronizing execution thread places the release value in the release-value-transmission field of the synchronizing execution thread's execution environment; and
C) the determination of whether the predecessor thread has updated the release-value-transmission field of the predecessor thread's execution environment is based on the contents of the release-value-ready field of the predecessor thread's execution environment.

67. A storage medium as defined in claim 58 wherein, when any thread is synchronized on a given object at the end of any said monitor-access operation performed on that object, that monitor-access operation results in a linked lock-record list, associated with that object, that comprises a lock record associated with each such thread.

68. A storage medium as defined in claim 67 wherein each lock record associated with a thread includes an owner field, which contains an identifier of the thread with which the lock record is associated.

69. A storage medium as defined in claim 68 wherein the identifier contained in the owner field of a lock record is a pointer to the execution environment of the thread with which that lock record is identified.

70. A storage medium as defined in claim 67 wherein one said monitor-access operation is a locking operation, which results in the linked list's beginning with a lock record associated with the synchronizing execution thread.

71. A storage medium as defined in claim 67 wherein, if any thread is synchronized on a given object at the end of any said monitor-access operation thereon and the atomic compare-and-swap operation of the meta-lock-release operation with which that monitor-access operation ends is successful, that meta-lock-release operation places in the object's identifier field a linked-list identifier that identifies the linked lock-record list associated with that object.

72. A storage medium as defined in claim 67 wherein, if any thread is synchronized on a given object at the end of any said monitor-access operation thereon in which the atomic compare-and-swap operation is unsuccessful, the release value placed into an execution environment during the resultant slow-meta-lock-release operation includes a linked-list identifier that identifies the linked lock-record list associated with that object.

73. A storage medium as defined in claim 72 wherein, if any thread is synchronized on a given object at the end of any said monitor-access operation thereon and the atomic compare-and-swap operation of the meta-lock-release operation with which that monitor-access operation ends is successful, that meta-lock-release operation places in the object's identifier field a linked-list identifier that identifies the linked lock-record list associated with that object.

74. A storage medium as defined in claim 73 wherein the linked-list identifier is an identifier of the first lock record in the linked list.

75. A storage medium as defined in claim 74 wherein the identifier of the first lock record in the linked list is a pointer to the first lock record in the linked list.

76. A storage medium as defined in claim 75 wherein the linked-list identifier is a truncated pointer to the first lock record in the linked list.

77. A computer system configured by computer instructions to operate as a compiler/interpreter that includes:
A) means for, in response to electrical signals representing source code that calls for execution of multiple execution threads, producing electrical signals representing object code that for each thread directs a processor to allocate an execution environment that includes a successor-identifier field, a release-value-reception field, and a release-value-transmission field;

B) means for, in response to electrical signals representing source code that calls for allocation of an object on which thread execution can be synchronized, producing electrical signals representing object code that directs a processor to allocate to the object an object structure that includes an identifier field and a synchronization-state field; and C) means for, in response to electrical signals representing source code that calls for a synchronizing execution thread to perform any one of a set of at least one monitor-access operation with respect to the object, producing electrical signals representing object code that directs a processor to perform a monitor-access operation that:

i) begins with a meta-lock-acquisition operation in which the synchronizing execution thread:

a) performs an atomic swap operation in which the synchronizing execution thread swaps pre-acquisition identifier-field and synchronization-state-field contents for an identifier of the synchronizing execution thread and a predetermined busy code; and b) if the pre-acquisition synchronization-state-field contents are the busy code, performs a slow-meta-lock operation in which the synchronizing execution thread copies a release value from the release-value-reception field of the synchronizing execution thread's execution environment or from the release-value-transmission field of a predecessor thread's execution environment;

ii) produces a release value by executing in accordance with the pre-acquisition synchronization-state-field contents if the pre-acquisition synchronization-state-field contents are not the busy code and by otherwise executing in accordance with the copied release value; and iii) ends with a meta-lock-release operation, in which the synchronizing execution thread:

a) performs an atomic compare-and-swap operation that:

(1) is successful, replacing pre-release contents of the object's identifier field and replacing pre-release contents of the object's synchronization-state field with a synchronization-state code other than the busy code, if the pre-release contents of the object's identifier field identify the synchronizing execution thread and the pre-release contents of the object's synchronization-state field are the busy code; and (2) is otherwise unsuccessful and does not replace the pre-release contents of the object's identifier and synchronization-state fields; and b) if the atomic compare-and-swap operation is unsuccessful, performs a slow-meta-lock-release operation, in which the synchronizing execution thread makes a determination of whether the contents of a successor-identifier field in its execution environment identifies a successor thread and:

(1) if so, places a release value in the release-value-reception field of the successor thread's execution environment; and (2) if not, places the release value in the release-value-transmission field of its own execution environment.

* * * * *